United States Patent
Takahashi et al.

(10) Patent No.: US 9,877,289 B2
(45) Date of Patent: Jan. 23, 2018

(54) USER APPARATUS, MOBILE COMMUNICATION SYSTEM, AND SIGNALING VALUE APPLICATION METHOD

(71) Applicant: NTT DOCOMO, INC., Tokyo (JP)

(72) Inventors: Hideaki Takahashi, Tokyo (JP); Hiromasa Umeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/324,020

(22) PCT Filed: Nov. 4, 2015

(86) PCT No.: PCT/JP2015/081082
§ 371 (c)(1),
(2) Date: Jan. 5, 2017

(87) PCT Pub. No.: WO2016/072430
PCT Pub. Date: May 12, 2016

(65) Prior Publication Data
US 2017/0208555 A1  Jul. 20, 2017

(30) Foreign Application Priority Data

Nov. 7, 2014 (JP) .................................. 2014-227472
May 28, 2015 (JP) .................................. 2015-109146

(51) Int. Cl.
*H04B 7/00* (2006.01)
*H04B 1/18* (2006.01)
(Continued)

(52) U.S. Cl.
CPC ......... *H04W 52/281* (2013.01); *H04W 36/04* (2013.01); *H04W 48/12* (2013.01);
(Continued)

(58) Field of Classification Search
CPC ... H04W 52/281; H04W 52/54; H04W 52/36; H04W 72/10; H04W 36/04; H04W 48/12
See application file for complete search history.

(56) References Cited

U.S. PATENT DOCUMENTS 5,930,684 A * 7/1999 Keskitalo ............ H04W 52/281
455/13.4
2005/0201281 A1* 9/2005 Damnjanovic ......... H04L 47/14
370/230
(Continued)

FOREIGN PATENT DOCUMENTS

WO  2013048198 A1  4/2013

OTHER PUBLICATIONS

Partial Supplementary European Search Report issued in the counterpart European Patent Application No. 15857193.5, dated Sep. 1, 2017 (16 pages).
Qualcomm Incorporated; "UE behavior upon receiving an unknown NS"; 3GPP TSG-RAN WG4 #72, R4-145095; Dresden, Germany, Aug. 18-22, 2014 (3 pages).
(Continued)

*Primary Examiner* — Dominic Rego
(74) *Attorney, Agent, or Firm* — Osha Liang LLP

(57) ABSTRACT

A user apparatus in a mobile communication system including a base station and the user apparatus, including: reception means configured to receive a plurality of prioritized signaling values corresponding to a band that the user apparatus uses from the base station; selection means configured to select a signaling value of the highest priority from among signaling values that the user apparatus can apply in the plurality of signaling values; and control means configured to perform control of transmission power by applying the signaling value selected by the selection means.

15 Claims, 27 Drawing Sheets

(51) Int. Cl.
*H04W 52/28* (2009.01)
*H04W 72/10* (2009.01)
*H04W 36/04* (2009.01)
*H04W 52/54* (2009.01)
*H04W 48/12* (2009.01)
*H04W 52/36* (2009.01)

(52) U.S. Cl.
CPC .......... *H04W 52/36* (2013.01); *H04W 52/54* (2013.01); *H04W 72/10* (2013.01)

(56) References Cited

U.S. PATENT DOCUMENTS

| | | | | |
|---|---|---|---|---|
| 2009/0058361 | A1* | 3/2009 | John | A61N 1/3785 320/128 |
| 2010/0004017 | A1* | 1/2010 | Kikuchi | H04B 7/0645 455/522 |
| 2011/0263216 | A1* | 10/2011 | Lee | H04B 1/0475 455/127.1 |
| 2013/0053103 | A1* | 2/2013 | Kim | H04L 5/003 455/561 |
| 2013/0201955 | A1* | 8/2013 | Vujcic | H04L 5/001 370/329 |
| 2013/0273917 | A1* | 10/2013 | Sfar | H04W 36/0094 455/436 |
| 2014/0248889 | A1 | 9/2014 | Van Lieshout et al. | |

OTHER PUBLICATIONS

Nokia Siemens Networks, et al.; "Multiple Band Indicators"; 3GPP TSG-RAN WG2 Meeting #77, R2-120102; Dresden, Germany, Feb. 6-10, 2012 (3 pages).

International Search Report issued in corresponding application No. PCT/JP2015/081082 dated Jan. 26, 2016 (2 pages).

Written Opinion of the International Searching Authority issued in corresponding application No. PCT/JP2015/081082 dated Jan. 26, 2016 (3 pages).

3GPP TS 36.101 V12.4.0, "3rd Generation Partnership Project; Technical Specification Group Radio Access Network; Evolved Universal Terrestrial Radio Access (E-UTRA); User Equipment (UE) radio transmission and reception (Release 12)"; Jun. 2014 (531 pages).

3GPP TS 36.331 V12.2.0, "3rd Generation Partnership Project; Technical Specification Group Radio Access Network; Evolved Universal Terrestrial Radio Access (E-UTRA); Radio Resource Control (RRC); Protocol specification (Release 12)"; Jun. 2014 (365 pages).

Extended European Search Report issued in corresponding European Patent Application No. 15857193.5, dated Nov. 21, 2017 (15 pages).

Nokia Networks, "Multiple NS values and P-max values per band", Change Request 36.331, CR CRNum rev—Current version: 9.i.0, 3GPP TSG-RAN WG2 Meeting #90, R2-15XXXX, Fukuoka, Japan, May 25-29, 2015 (23 pages).

* cited by examiner

FIG.1

Table 6.2.4-1: Additional Maximum Power Reduction (A-MPR)

| Network Signalling value | Requirements (subclause) | E-UTRA Band | Channel bandwidth (MHz) | Resources Blocks ($N_{RB}$) | A-MPR (dB) |
|---|---|---|---|---|---|
| NS_01 | 6.6.2.1.1 | Table 5.5-1 | 1.4, 3, 5, 10, 15, 20 | Table 5.6-1 | N/A |
| NS_05 | 6.6.3.3.1 | 1 | 10,15,20 | ≥ 50 | ≤ 1 |
| NS_07 | 6.6.2.2.3<br>6.6.3.3.2 | 13 | 10 | Table 6.2.4-2 | |
| NS_17 | 6.6.3.3.10 | 28 | 5, 10 | Table 5.6-1 | N/A |

FIG.5A

```
                        SystemInformationBlockType1 message

-- ASN1START

SystemInformationBlockType1 ::=    SEQUENCE {
    cellAccessRelatedInfo              SEQUENCE {
        plmn-IdentityList                  PLMN-IdentityList,
        trackingAreaCode                   TrackingAreaCode,
        cellIdentity                       CellIdentity,
        cellBarred                         ENUMERATED {barred, notBarred},
        intraFreqReselection               ENUMERATED {allowed, notAllowed},
        csg-Indication                     BOOLEAN,
        csg-Identity                       CSG-Identity          OPTIONAL -- Need OR
    },
    cellSelectionInfo                  SEQUENCE {
        q-RxLevMin                         Q-RxLevMin,
        q-RxLevMinOffset                   INTEGER (1..8)        OPTIONAL -- Need OP
    },
    p-Max                              P-Max                     OPTIONAL,       -- Need OP
A── freqBandIndicator                  FreqBandIndicator,
    schedulingInfoList                 SchedulingInfoList,
    tdd-Config                         TDD-Config                OPTIONAL,-- Cond TDD
    si-WindowLength                    ENUMERATED {
                                           ms1, ms2, ms5, ms10, ms15, ms20,
                                           ms40},
    systemInfoValueTag                 INTEGER (0..31),
    nonCriticalExtension               SystemInformationBlockType1-v890-IEsOPTIONAL
}

SystemInformationBlockType1-v890-IEs::= SEQUENCE {
    lateNonCriticalExtension           OCTET STRING (CONTAINING SystemInformationBlockType1-v8h0-IEs)
            OPTIONAL,
    nonCriticalExtension               SystemInformationBlockType1-v920-IEsOPTIONAL
}

-- Late non critical extensions
SystemInformationBlockType1-v8h0-IEs ::=   SEQUENCE {
B── multiBandInfoList                  MultiBandInfoList     OPTIONAL,-- Need OR
    nonCriticalExtension               SystemInformationBlockType1-v9e0-IEs     OPTIONAL
}

SystemInformationBlockType1-v9e0-IEs ::= SEQUENCE {
A── freqBandIndicator-v9e0             FreqBandIndicator-v9e0    OPTIONAL,-- Cond FBI-max
    multiBandInfoList-v9e0             MultiBandInfoList-v9e0    OPTIONAL,-- Cond mFBI-max
B── nonCriticalExtension               SEQUENCE {}               OPTIONAL
}

-- Regular non critical extensions
SystemInformationBlockType1-v920-IEs ::= SEQUENCE {
```

FIG.5B

| SystemInformationBlockType1 field descriptions |
|---|
| multiBandInfoList<br>A list of additional frequency band indicators, as defined in TS 36.101 [42, table 5.5-1] that the cell belongs to. If the UE supports the frequency band in the freqBandIndicator IE it shall apply that frequency band. Otherwise, the UE shall apply the first listed band which it supports in the multiBandInfoList IE. If E-UTRAN includes multiBandInfoList-v9e0 it includes the same number of entries, and listed in the same order, as in multiBandInfoList (i.e. without suffix). See Annex D for more descriptions. |

FIG. 6A

```
SystemInformationBlockType2 information element

-- ASN1START
SystemInformationBlockType2 ::=          SEQUENCE {
    ac-BarringInfo                       SEQUENCE {
        ac-BarringForEmergency               BOOLEAN,
        ac-BarringForMO-Signalling           AC-BarringConfig          OPTIONAL,  -- Need OP
        ac-BarringForMO-Data                 AC-BarringConfig          OPTIONAL,  -- Need OP
    }                                                                             -- Need OP
    radioResourceConfigCommon            RadioResourceConfigCommonSIB,
    ue-TimersAndConstants                UE-TimersAndConstants,
    freqInfo                             SEQUENCE {
        ARFCN-ValueEUTRA                                               OPTIONAL,  -- Need OP SystemInformationBlockType2-v8h0-IEs ::= SEQUENCE {
    multiBandInfoList                    SEQUENCE (SIZE (1..maxMultiBands)) OF AdditionalSpectrumEmission
        OPTIONAL,                -- Need OR
    nonCriticalExtension                 SystemInformationBlockType2-v9e0-IEs    OPTIONAL
}

SystemInformationBlockType2-v9e0-IEs ::= SEQUENCE {
    ul-CarrierFreq-v9e0                  ARFCN-ValueEUTRA-v9e0        OPTIONAL,  -- Cond ul-FreqMax
    nonCriticalExtension                 SystemInformationBlockType2-v9xy-IEs
        OPTIONAL
}

SystemInformationBlockType2-v9xy-IEs ::= SEQUENCE {
    additionalSpectrumEmissionList-r9    AdditionalSpectrumEmissionList-r9 OPTIONAL,  -- Need OR
    multiBandInfoList2                   SEQUENCE (SIZE (1..maxMultiBands)) OF
        AdditionalSpectrumEmissionList-r9 OPTIONAL,   -- Need OR
    nonCriticalExtension                 SystemInformationBlockType2-v9xy-IEs
        OPTIONAL
}

AC-BarringConfig ::=                     SEQUENCE {
    ac-BarringFactor                     ENUMERATED {
                                             p00, p05, p10, p15, p20, p25, p30, p40,
                                             p50, p60, p70, p75, p80, p85, p90, p95},
    ac-BarringTime                       ENUMERATED {s4, s8, s16, s32, s64, s128, s256, s512},
    ac-BarringForSpecialAC               BIT STRING (SIZE(5))
}

AdditionalSpectrumEmissionList-r9 ::=    SEQUENCE (SIZE (1..maxMultiNS-r9)) OF
    AdditionalSpectrumEmission MBSFN-SubframeConfigList ::=             SEQUENCE (SIZE (1..maxMBSFN-Allocations)) OF MBSFN-SubframeConfig

-- ASN1STOP
```

FIG.6B

| SystemInformationBlockType2 field descriptions |
|---|
| *additionalSpectrumEmission*<br>The UE requirements related to IE *AdditionalSpectrumEmission* are defined in TS 36.101 [42, table 6.2.4.1]. |
| *additionalSpectrumEmissionList*<br>A list of additional spectrum emissions as defined in TS 36.101 for the band indicated by IE FreqBandIndicator in SIB1. The UE shall apply the first listed additional spectrum emission which it supports in the additionalSpectrumEmissionList IE. |
| *mbsfn-SubframeConfigList*<br>Defines the subframes that are reserved for MBSFN in downlink. |
| *multiBandInfoList*<br>A list of *additionalSpectrumEmission* i.e. one for each additional frequency band included in *multiBandInfoList* in *SystemInformationBlockType1*, listed in the same order. |
| *multiBandInfoList2*<br>A list of *additionalSpectrumEmissionList* i.e. one for each additional frequency band included in *multiBandInfoList* in *SystemInformationBlockType1*, listed in the same order. |

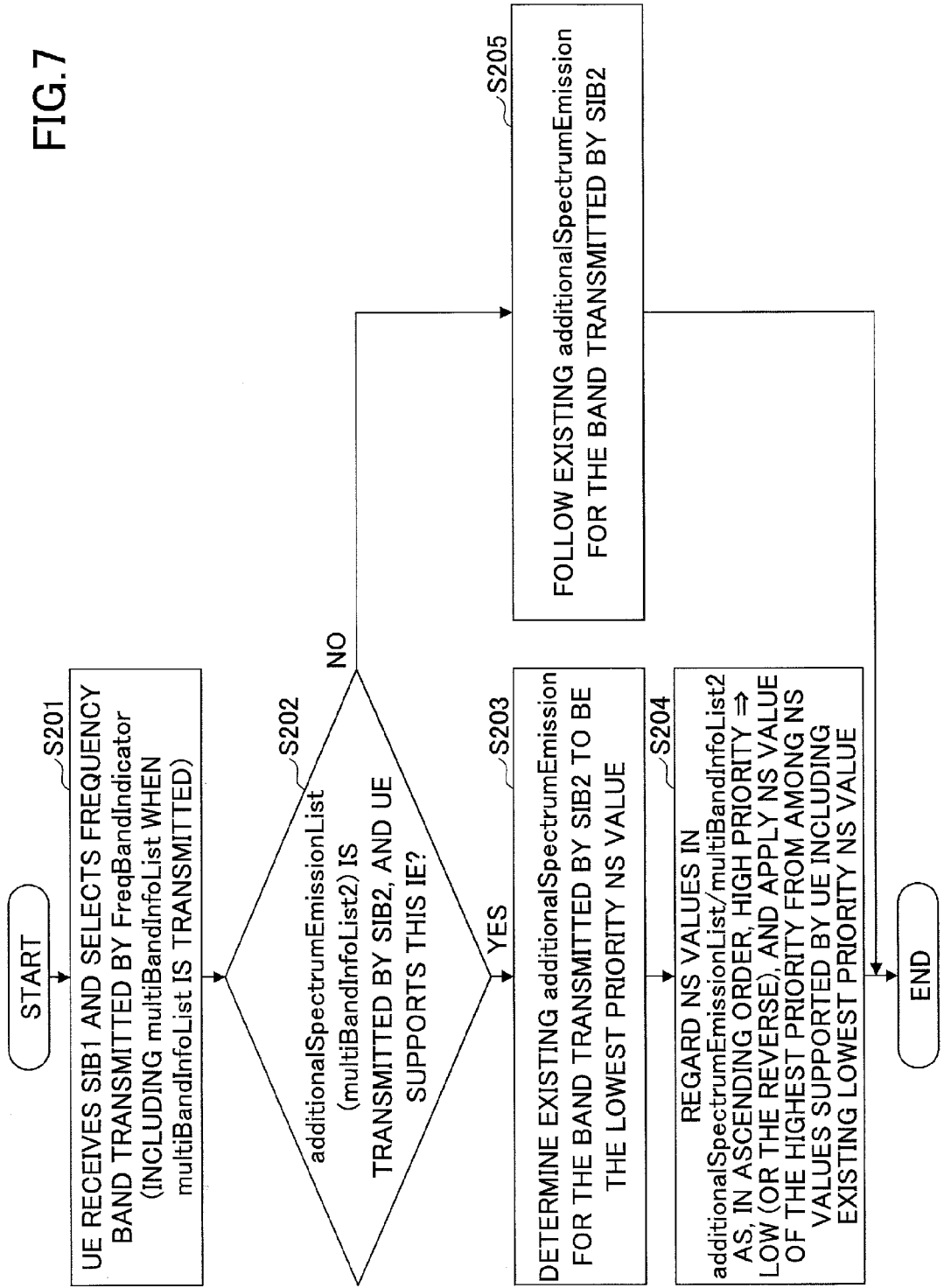

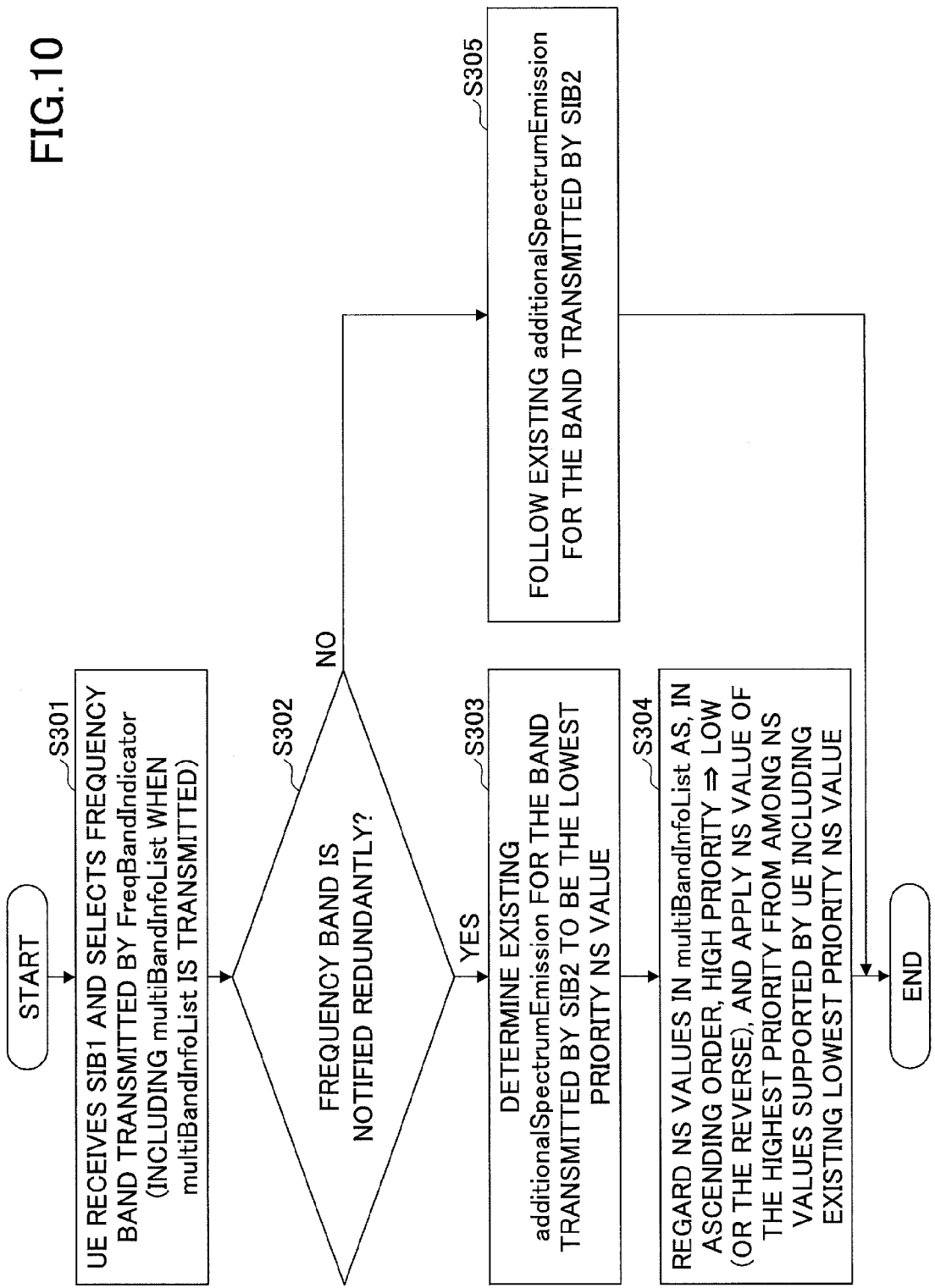

FIG.11

```
                    SystemInformationBlockType5 information element
-- ASN1START SystemInformationBlockType5 ::=      SEQUENCE {
    interFreqCarrierFreqList             InterFreqCarrierFreqList,
    ...,
    lateNonCriticalExtension                   OCTET STRING (CONTAINING SystemInformationBlockType5-
v8h0-IEs)               OPTIONAL      -- Need OP
}

SystemInformationBlockType5-v8h0-IEs ::=      SEQUENCE {
    interFreqCarrierFreqList-v8h0 SEQUENCE (SIZE (1..maxFreq)) OF InterFreqCarrierFreqInfo-v8h0
        OPTIONAL,-- Need OP
    nonCriticalExtension         SystemInformationBlockType5-v9e0-IEs    OPTIONAL -- Need OP
}

SystemInformationBlockType5-v9e0-IEs ::=      SEQUENCE {
    interFreqCarrierFreqList-v9e0   SEQUENCE (SIZE (1..maxFreq)) OF InterFreqCarrierFreqInfo-v9e0
        OPTIONAL,       -- Need OR
    nonCriticalExtension        SystemInformationBlockType5-v9xy-IEs
        OPTIONAL        -- Need OP
}

SystemInformationBlockType5-v9xy-IEs ::=     SEQUENCE {
    interFreqCarrierFreqList-v9xy   SEQUENCE (SIZE (1..maxFreq)) OF InterFreqCarrierFreqInfo-v9xy
        OPTIONAL,       -- Need OR
    nonCriticalExtension        SEQUENCE {}                      OPTIONAL      -- Need OP
}

InterFreqCarrierFreqList ::=     SEQUENCE (SIZE (1..maxFreq)) OF InterFreqCarrierFreqInfo InterFreqCarrierFreqInfo ::=   SEQUENCE {
    dl-CarrierFreq               ARFCN-ValueEUTRA,
    q-RxLevMin                   Q-RxLevMin,
    p-Max                        P-Max                           OPTIONAL,    -- Need OP InterFreqCarrierFreqInfo-v9e0 ::=SEQUENCE {
    dl-CarrierFreq-v9e0          ARFCN-ValueEUTRA-v9e0 OPTIONAL,    -- Cond dl-FreqMax
    multiBandInfoList-v9e0       MultiBandInfoList-v9e0 OPTIONAL    -- Need OR
}

InterFreqCarrierFreqInfo-v9xy ::=SEQUENCE {
    multiMPR-InfoList-r9         SEQUENCE (SIZE (1..maxA-MPRs-r9)) OF MPR-Info-r9 OPTIONAL
        -- Need OR
}

InterFreqNeighCellList ::=    SEQUENCE (SIZE (1..maxCellInter)) OF InterFreqNeighCellInfo InterFreqNeighCellInfo ::=    SEQUENCE {
    physCellId                   PhysCellId,
    q-OffsetCell                 Q-OffsetRange
}

InterFreqBlackCellList ::=    SEQUENCE (SIZE (1..maxCellBlack)) OF PhysCellIdRange MPR-Info-r9 ::=        SEQUENCE {
    additionalSpectrumEmission   AdditionalSpectrumEmission,
    p-Max                        P-Max                           OPTIONAL,    -- Need OP
}

-- ASN1STOP
```

FIG.12

| SystemInformationBlockType5 field descriptions |
|---|
| *multiBandInfoList*<br>Indicates the list of frequency bands in addition to the band represented by *dl-CarrierFreq* for which cell reselection parameters are common. E-UTRAN indicates at most *maxMultiBands* frequency bands (i.e. the total number of entries across both *multiBandInfoList* and *multiBandInfoList-v9e0* is below this limit). |
| *multiMPR-InfoList*<br>A list of *additionalSpectrumEmission* and the associated Pmax in the order of priority. If p-Max is absent in the MPR-Info, the UE shall consider the *P-Max* in the *InterFreqCarrierFreqInfo* (without suffix) applicable. If the UE does not support any of the *additionalSpectrumEmission* in the list, the UE shall consider the *P-Max* in the *InterFreqCarrierFreqInfo* (without suffix) applicable. |
| *p-Max*<br>Value applicable for the neighbouring E-UTRA cells on this carrier frequency. If absent the UE applies the maximum power according to the UE capability. |
| *threshX-High*<br>Parameter "$Thresh_{X,HighP}$" in TS 36.304 [4]. |
| *threshX-Low*<br>Parameter "$Thresh_{X,LowP}$" in TS 36.304 [4]. |
| *t-ReselectionEUTRA*<br>Parameter "$Treselection_{EUTRA}$" in TS 36.304 [4]. |
| *t-ReselectionEUTRA-SF*<br>Parameter "Speed dependent ScalingFactor for $Treselection_{EUTRA}$" in TS 36.304 [4]. If the field is not present, the UE behaviour is specified in TS 36.304 [4]. |
| *q-OffsetFreq*<br>Parameter "$Qoffset_{frequency}$" in TS 36.304 [4]. |
| *interFreqNeighCellList*<br>List of inter-frequency neighbouring cells with specific cell re-selection parameters. |
| *q-OffsetCell*<br>Parameter "$Qoffset_{s,n}$" in TS 36.304 [4]. |
| *interFreqBlackCellList*<br>List of blacklisted inter-frequency neighbouring cells. |
| *interFreqCarrierFreqList*<br>List of neighbouring inter-frequencies. E-UTRAN does not configure more than one entry for the same physical frequency regardless of the E-ARFCN used to indicate this. If E-UTRAN includes *interFreqCarrierFreqList-v8h0* and/ or *interFreqCarrierFreqList-v9e0* and/or *interFreqCarrierFreqList-v9xy* it includes the same number of entries, and listed in the same order, as in *interFreqCarrierFreqList* (i.e. without suffix). See Annex D for more descriptions. |
| *q-QualMin*<br>Parameter "$Q_{qualmin}$" in TS 36.304 [4]. If the field is not present, the UE applies the (default) value of negative infinity for $Q_{qualmin}$. |
| *threshX-HighQ*<br>Parameter "$Thresh_{X,HighQ}$" in TS 36.304 [4]. |
| *threshX-LowQ*<br>Parameter "$Thresh_{X,LowQ}$" in TS 36.304 [4]. |

FIG.13

```
                    SystemInformationBlockType5 information element

-- ASN1START

SystemInformationBlockType5 ::=   SEQUENCE {
    interFreqCarrierFreqList      InterFreqCarrierFreqList,
    ..., SystemInformationBlockType5-v9e0-IEs ::=   SEQUENCE {
    interFreqCarrierFreqList-v9e0   SEQUENCE (SIZE (1..maxFreq)) OF InterFreqCarrierFreqInfo-v9e0
        OPTIONAL,    -- Need OR
    nonCriticalExtension            SystemInformationBlockType5-v10xy-IEsSEQUENCE {}
        OPTIONAL     -- Need OP
}

SystemInformationBlockType5-v10xy-IEs ::= SEQUENCE {
    interFreqCarrierFreqList-v10xy  SEQUENCE (SIZE (1..maxFreq)) OF InterFreqCarrierFreqInfo-v10xy
        OPTIONAL,    -- Need OR
    nonCriticalExtension            SEQUENCE {}                                OPTIONAL    -- Need OP
}

InterFreqCarrierFreqList ::=     SEQUENCE (SIZE (1..maxFreq)) OF InterFreqCarrierFreqInfo InterFreqCarrierFreqInfo ::=    SEQUENCE {
    dl-CarrierFreq               ARFCN-ValueEUTRA,
    q-RxLevMin                   Q-RxLevMin,
    p-Max                        P-Max                      OPTIONAL,    -- Need OP
    t-ReselectionEUTRA           T-Reselection,
    t-ReselectionEUTRA-SF        SpeedStateScaleFactors     OPTIONAL,    -- Need OP

[[  q-QualMin-r9             Q-QualMin-r9               OPTIONAL,    -- Need OP
        threshX-Q-r9             SEQUENCE {
            threshX-HighQ-r9         ReselectionThresholdQ-r9,
            threshX-LowQ-r9          ReselectionThresholdQ-r9
        }                                                   OPTIONAL    -- Cond RSRQ
    ]]
}

InterFreqCarrierFreqInfo-v8h0 ::=   SEQUENCE {
    multiBandInfoList             MultiBandInfoList         OPTIONAL    -- Need OR
}

InterFreqCarrierFreqInfo-v9e0 ::=  SEQUENCE {
    dl-CarrierFreq-v9e0           ARFCN-ValueEUTRA-v9e0     OPTIONAL,   -- Cond dl-FreqMax
    multiBandInfoList-v9e0        MultiBandInfoList-v9e0    OPTIONAL    -- Need OR
}

InterFreqCarrierFreqInfo-v10xy ::= SEQUENCE {
    additional-ns-values                SEQUENCE (SIZE (1..maxMultiBands-Plus1)) OF P-maxNS-
valueList OPTIONAL   -- Need OR
}

P-maxNS-valueList ::=                    SEQUENCE {
       p-maxPerNS-value          SEQUENCE (SIZE (1..maxNS-values)) OF P-maxPerNS-value
}

P-maxPerNS-value ::=            SEQUENCE {
       p-maxNew                  P-Max                           OPTIONAL,   -- Need OP
       additionalSpectrumEmission AdditionalSpectrumEmission     OPTIONAL    -- Need OP
}

InterFreqNeighCellList ::=      SEQUENCE (SIZE (1..maxCellInter)) OF InterFreqNeighCellInfo InterFreqNeighCellInfo ::=      SEQUENCE {
    physCellId                       PhysCellId,
```

FIG.14

| SystemInformationBlockType5 field descriptions |
|---|
| additional-ns-values<br>A list of additional P-max and NS-values for the band. First *P-maxNS-valueList* contains additional P-max and NS-values corresponding to *freqBandIndicator* in *SystemInformationBlockType1*. Subsequent *P-maxNS-valueList* correspond to each *additionalSpectrumEmission* included in *multiBandInfoList* in *SystemInformationBlockType2*, listed in the same order. |
| First pair of values in *P-maxNS-valueList* shall at most include *P-max* corresponding to *additionalSpectrumEmission* included in *freqInfo* or *multiBandInfoList*, subsequent pair of values includes at least *additionalSpectrumEmission*. |
| The UE shall apply the first supported additional spectrum emission in the list of the selected band. If none is supported then UE shall apply *additionalSpectrumEmission* included in *freqInfo* or *multiBandInfoList*. |

FIG.15

```
                        SystemInformationBlockType3 information element
-- ASN1START SystemInformationBlockType3 ::=     SEQUENCE {
    cellReselectionInfoCommon           SEQUENCE {
        q-Hyst                              ENUMERATED {
                                                dB0, dB1, dB2, dB3, dB4, dB5, dB6, dB8, dB10,
                                                dB12, dB14, dB16, dB18, dB20, dB22, dB24},
        speedStateReselectionPars           SEQUENCE {
            mobilityStateParameters             MobilityStateParameters,
            q-HystSF                            SEQUENCE {
                sf-Medium                           ENUMERATED {
                                                        dB-6, dB-4, dB-2, dB0},
                sf-High                             ENUMERATED {
                                                        dB-6, dB-4, dB-2, dB0}
            }
        }                                                       OPTIONAL     -- Need OP
    },
    cellReselectionServingFreqInfo      SEQUENCE {
        s-NonIntraSearch                    ReselectionThreshold    OPTIONAL,    -- Need OP
        threshServingLow                    ReselectionThreshold,
        cellReselectionPriority             CellReselectionPriority
    },
    intraFreqCellReselectionInfo        SEQUENCE {
        q-RxLevMin                          Q-RxLevMin,
        p-Max                               P-Max                   OPTIONAL,    -- Need OP
        s-IntraSearch                       ReselectionThreshold    OPTIONAL,    -- Need OP
        allowedMeasBandwidth                AllowedMeasBandwidth    OPTIONAL,    -- Need OP
        presenceAntennaPort1                PresenceAntennaPort1,
        neighCellConfig                     NeighCellConfig,
        t-ReselectionEUTRA                  T-Reselection,
        t-ReselectionEUTRA-SF               SpeedStateScaleFactors  OPTIONAL     -- Need OP
    },
    ...,
    lateNonCriticalExtension            OCTET STRING (CONTAINING
 intraFreqCellReselectionInfo-v9xy-IEs)      OPTIONAL, -- Need OP
    [[  s-IntraSearch-v920                 SEQUENCE {
            s-IntraSearchP-r9                   ReselectionThreshold,
            s-IntraSearchQ-r9                   ReselectionThresholdQ-r9
        }                                                       OPTIONAL,    -- Need OP
        s-NonIntraSearch-v920               SEQUENCE {
            s-NonIntraSearchP-r9                ReselectionThreshold,
            s-NonIntraSearchQ-r9                ReselectionThresholdQ-r9
        }                                                       OPTIONAL,    -- Need OP
        q-QualMin-r9                        Q-QualMin-r9            OPTIONAL,    -- Need OP
        threshServingLowQ-r9                ReselectionThresholdQ-r9 OPTIONAL    -- Need OP
    ]]
}

IntraFreqCellReselectionInfo-v9xy-IEs ::=           SEQUENCE {
    multiMPR-InfoList-r9                SEQUENCE (SIZE (1..maxA-MPRs-r9)) OF MPR-Info-r9  OPTIONAL
    -- Need OR
}

MPR-Info-r9 ::=         SEQUENCE {
    additionalSpectrumEmission          AdditionalSpectrumEmission,
    p-Max                               P-Max                   OPTIONAL,    -- Need OP
}

-- ASN1STOP
```

FIG.16

| SystemInformationBlockType3 field descriptions |
| --- |
| cellReselectionInfoCommon |
| Cell re-selection information common for cells. |
| multiMPR-InfoList |
| A list of *additionalSpectrumEmission* and the associated Pmax in the order of priority. If p-Max is absent in the MPR-Info, the UE shall consider the *P-Max* in the *intraFreqCellReselectionInfo* (without suffix) applicable. If the UE does not support any of the *additionalSpectrumEmission* in the list, the UE shall consider the *P-Max* in the *intraFreqCellReselectionInfo* (without suffix) applicable. |
| q-Hyst |
| Parameter $Q_{hyst}$ in 36.304 [4], Value in dB. Value dB1 corresponds to 1 dB, dB2 corresponds to 2 dB and so on. |
| speedStateReselectionPars |
| Speed dependent reselection parameters, see TS 36.304 [4]. If this field is absent, i.e, *mobilityStateParameters* is also not present, UE behaviour is specified in TS 36.304 [4]. |
| q-HystSF |
| Parameter "Speed dependent ScalingFactor for $Q_{hyst}$" in TS 36.304 [4]. The sf-Medium and sf-High concern the additional hysteresis to be applied, in Medium and High Mobility state respectively, to $Q_{hyst}$ as defined in TS 36.304 [4]. In dB. Value dB-6 corresponds to -6dB, dB-4 corresponds to -4dB and so on. |
| t-ReselectionEUTRA |
| Parameter "Treselection$_{EUTRA}$" in TS 36.304 [4]. |
| t-ReselectionEUTRA-SF |
| Parameter "Speed dependent ScalingFactor for Treselection$_{EUTRA}$" in TS 36.304 [4]. If the field is not present, the UE behaviour is specified in TS 36.304 [4]. |
| q-RxLevMin |
| Parameter "$Q_{rxlevmin}$" in TS 36.304 [4], applicable for intra-frequency neighbour cells. |
| s-IntraSearch |
| Parameter "$S_{IntraSearchP}$" in TS 36.304 [4]. If the field *s-IntraSearchP* is present, the UE applies the value of *s-IntraSearchP* instead. Otherwise if neither *s-IntraSearch* nor *s-IntraSearchP* is present, the UE applies the (default) value of infinity for $S_{IntraSearchP}$. |
| cellReselectionServingFreqInfo |
| Information common for Cell re-selection to inter-frequency and inter-RAT cells. |
| s-NonIntraSearch |
| Parameter "$S_{nonIntraSearchP}$" in TS 36.304 [4]. If the field *s-NonIntraSearchP* is present, the UE applies the value of *s-NonIntraSearchP* instead. Otherwise if neither *s-NonIntraSearch* nor *s-NonIntraSearchP* is present, the UE applies the (default) value of infinity for $S_{nonIntraSearchP}$. |
| threshServingLow |
| Parameter "Thresh$_{Serving,\ LowP}$" in TS 36.304 [4]. |
| IntraFreqcellReselectionInfo |
| Cell re-selection information common for intra-frequency cells. |
| p-Max |
| Value applicable for the intra-frequency neighbouring E-UTRA cells. If absent the UE applies the maximum power according to the UE capability. |
| allowedMeasBandwidth |
| If absent, the value corresponding to the downlink bandwidth indicated by the *dl-Bandwidth* included in *MasterInformationBlock* applies. |
| s-IntraSearchP |
| Parameter "$S_{IntraSearchP}$" in TS 36.304 [4]. See descriptions under *s-IntraSearch*. |
| s-IntraSearchQ |
| Parameter "$S_{IntraSearchQ}$" in TS 36.304 [4]. If the field is not present, the UE applies the (default) value of 0 dB for $S_{IntraSearchQ}$. |
| s-NonIntraSearchP |
| Parameter "$S_{nonIntraSearchP}$" in TS 36.304 [4]. See descriptions under *s-NonIntraSearch*. |
| s-NonIntraSearchQ |
| Parameter "$S_{nonIntraSearchQ}$" in TS 36.304 [4]. If the field is not present, the UE applies the (default) value of 0 dB for $S_{nonIntraSearchQ}$. |
| q-QualMin |
| Parameter "$Q_{qualmin}$" in TS 36.304 [4], applicable for intra-frequency neighrbour cells. If the field is not present, the UE applies the (default) value of negative infinity for $Q_{qualmin}$. |
| threshServingLowQ |
| Parameter "Thresh$_{Serving,\ LowQ}$" in TS 36.304 [4]. |

FIG.17

```
SystemInformationBlockType3 information element

-- ASN1START

SystemInformationBlockType3 ::=     SEQUENCE {
    cellReselectionInfoCommon       SEQUENCE {
        q-Hyst                      ENUMERATED {
                                        dB0, dB1, dB2, dB3, dB4, dB5, dB6, dB8, dB10,
                                        dB12, dB14, dB16, dB18, dB20, dB22, dB24}, speedStateReselectionPars   SEQUENCE {
            mobilityStateParameters     MobilityStateParameters,
            q-HystSF                    SEQUENCE {
~~~~~~~~~~~~~~~~~~~~~~~~~~~~~~~~~~~~~~~~~~~~~~~~~~~~~~~~~~~~~~~~~~~~~~~~~~~~~~~~
        q-RxLevMin                  Q-RxLevMin,
        p-Max                       P-Max                   OPTIONAL,    -- Need OP
        s-IntraSearch               ReselectionThreshold    OPTIONAL,    -- Need OP
        allowedMeasBandwidth        AllowedMeasBandwidth    OPTIONAL,    -- Need OP
        presenceAntennaPort1        PresenceAntennaPort1,
        neighCellConfig             NeighCellConfig,
        t-ReselectionEUTRA          T-Reselection,
        t-ReselectionEUTRA-SF       SpeedStateScaleFactors  OPTIONAL     -- Need OP
    },
    ...,
    lateNonCriticalExtension                                OCTET STRING (CONTAINING SystemInformationBlockType3-
v10xy-IEs)                  OPTIONAL,   -- Need OP
    [[  s-IntraSearch-v920          SEQUENCE {
            s-IntraSearchP-r9           ReselectionThreshold,
            s-IntraSearchQ-r9           ReselectionThresholdQ-r9
                                                            OPTIONAL,    -- Need OP
        s-NonIntraSearch-v920       SEQUENCE {
            s-NonIntraSearchP-r9        ReselectionThreshold,
            s-NonIntraSearchQ-r9        ReselectionThresholdQ-r9
                                                            OPTIONAL,    -- Need OP
        q-QualMin-r9                Q-QualMin-r9            OPTIONAL,    -- Need OP
        threshServingLowQ-r9        ReselectionThresholdQ-r9 OPTIONAL    -- Need OP
    ]]
}

SystemInformationBlockType3-v10xx-IEs ::=    SEQUENCE {
    additional-ns-values            SEQUENCE (SIZE (1..maxMultiBands-Plus1)) OF P-maxNS-
valueList OPTIONAL,     -- Need OR
    nonCriticalExtension            SEQUENCE {}                    OPTIONAL    -- Need OP
}

P-maxNS-valueList ::=               SEQUENCE {
    p-maxPerNS-value                SEQUENCE (SIZE (1..maxNS-values)) OF P-maxPerNS-value
}

P-maxPerNS-value ::=                SEQUENCE {
    p-maxNew                        P-Max                           OPTIONAL,   -- Need OP
    additionalSpectrumEmission      AdditionalSpectrumEmission      OPTIONAL    -- Need OP
}

-- ASN1STOP
```

FIG.18

| SystemInformationBlockType3 field descriptions |
|---|
| *additional-ns-values*<br>A list of additional P-max and NS-values for the band. First *P-maxNS-valueList* contains additional P-max and NS-values corresponding to *freqBandIndicator* in *SystemInformationBlockType1*. Subsequent *P-maxNS-valueList* correspond to each *additionalSpectrumEmission* included in *multiBandInfoList* in *SystemInformationBlockType2*, listed in the same order.<br><br>First pair of values in *P-maxNS-valueList* shall at most include *P-max* corresponding to *additionalSpectrumEmission* included in *freqInfo* or *multiBandInfoList*, subsequent pair of values includes at least *additionalSpectrumEmission*.<br><br>The UE shall apply the first supported additional spectrum emission in the list of the selected band. If none is supported then UE shall apply *additionalSpectrumEmission* included in *freqInfo* or *multiBandInfoList*. |

FIG.19

```
                            SystemInformationBlockType1 message
-- ASN1START SystemInformationBlockType1 ::=     SEQUENCE {
    cellAccessRelatedInfo               SEQUENCE {
        plmn-IdentityList                   PLMN-IdentityList,
        trackingAreaCode                    TrackingAreaCode,
        cellIdentity                        CellIdentity,
        cellBarred                          ENUMERATED {barred, notBarred},
        intraFreqReselection                ENUMERATED {allowed, notAllowed},
        csg-Indication                      BOOLEAN,
        csg-Identity                        CSG-Identity            OPTIONAL    -- Need OR
    },
    cellSelectionInfo                   SEQUENCE {
        q-RxLevMin                          Q-RxLevMin,
        q-RxLevMinOffset                    INTEGER (1..8)          OPTIONAL    -- Need OP
    },
    p-Max                               P-Max                       OPTIONAL,               -- Need OP
    freqBandIndicator                   FreqBandIndicator,
    schedulingInfoList                  SchedulingInfoList,
    tdd-Config                          TDD-Config                  OPTIONAL,   -- Cond TDD
    si-WindowLength                     ENUMERATED {
                                            ms1, ms2, ms5, ms10, ms15, ms20,
                                            ms40},
    systemInfoValueTag                  INTEGER (0..31),
    nonCriticalExtension                SystemInformationBlockType1-v890-IEs
    OPTIONAL
}

SystemInformationBlockType1-v890-IEs::= SEQUENCE {
    lateNonCriticalExtension            OCTET STRING (CONTAINING SystemInformationBlockType1-
v8h0-IEs)            OPTIONAL,      -- Need OP
    nonCriticalExtension                SystemInformationBlockType1-v920-IEs    OPTIONAL
}

SystemInformationBlockType1-v8h0-IEs ::=    SEQUENCE {
    multiBandInfoList                   MultiBandInfoList           OPTIONAL,   -- Need OR
    nonCriticalExtension                SystemInformationBlockType1-v9e0-IEs    OPTIONAL    -- Need OP
}

SystemInformationBlockType1-v9e0-IEs ::= SEQUENCE {
    freqBandIndicator-v9e0              FreqBandIndicator-v9e0      OPTIONAL,   -- Cond FBI-max
    multiBandInfoList-v9e0              MultiBandInfoList-v9e0      OPTIONAL,   -- Cond mFBI-max
    nonCriticalExtension                SystemInformationBlockType1-v9xy-IEs
    OPTIONAL        -- Need OP
}

SystemInformationBlockType1-v9xy-IEs ::=        SEQUENCE {
    multiMPR-InfoList-r9                SEQUENCE (SIZE (1..maxA-MPRs-r9)) OF MPR-Info-r9 OPTIONAL
    -- Need OR
    nonCriticalExtension                SystemInformationBlockType1-v9e0-IEs    OPTIONAL        -- Need OP
}

SystemInformationBlockType1-v920-IEs ::=    SEQUENCE {
    ims-EmergencySupport-r9             ENUMERATED {true}           OPTIONAL,   -- Need OR
    cellSelectionInfo-v920              CellSelectionInfo-v920                  OPTIONAL,   -- Cond RSRQ
    nonCriticalExtension                SEQUENCE {}                             OPTIONAL    -- Need OP
}

MPR-Info-r9 ::=         SEQUENCE {
    additionalSpectrumEmission          AdditionalSpectrumEmission,
    p-Max                               P-Max                       OPTIONAL,   -- Need OP
}
```

FIG.20

```
                        SystemInformationBlockType1 message
-- ASN1START

SystemInformationBlockType1 ::=   SEQUENCE {
    cellAccessRelatedInfo             SEQUENCE {
        plmn-IdentityList                 PLMN-IdentityList,
```

```
SystemInformationBlockType1-v8h0-IEs ::=   SEQUENCE {
    multiBandInfoList            MultiBandInfoList    OPTIONAL,    -- Need OR
    nonCriticalExtension         SystemInformationBlockType1-v9e0-IEs    OPTIONAL    -- Need
OP
}

SystemInformationBlockType1-v9e0-IEs ::= SEQUENCE {
    freqBandIndicator-v9e0       FreqBandIndicator-v9e0    OPTIONAL,    -- Cond FBI-max
    multiBandInfoList-v9e0       MultiBandInfoList-v9e0    OPTIONAL,    -- Cond mFBI-max
    nonCriticalExtension         SystemInformationBlockType1-v10xySEQUENCE {}
    OPTIONAL    -- Need OP
}

SystemInformationBlockType1-v920-IEs ::=    SEQUENCE {
    ims-EmergencySupport-r9      ENUMERATED {true}          OPTIONAL,     -- Need OR
    cellSelectionInfo-v920       CellSelectionInfo-v920     OPTIONAL,     -- Cond RSRQ
    nonCriticalExtension         SEQUENCE {}                OPTIONAL      -- Need OP
}

SystemInformationBlockType1-v10xx-IEs ::= SEQUENCE {
    additional-ns-values                 SEQUENCE (SIZE (1..maxMultiBands-Plus1)) OF P-maxNS-
valueList OPTIONAL,    -- Need OR
    nonCriticalExtension         SEQUENCE {}                    OPTIONAL    -- Need OP
}

P-maxNS-valueList ::=                      SEQUENCE {
        p-maxPerNS-value             SEQUENCE (SIZE (1..maxNS-values)) OF P-maxPerNS-value
    }

P-maxPerNS-value ::=              SEQUENCE {
        p-maxNew                     P-Max                            OPTIONAL,    -- Need OP
        additionalSpectrumEmission   AdditionalSpectrumEmission       OPTIONAL     -- Need OP
    }

PLMN-IdentityList ::=             SEQUENCE (SIZE (1..6)) OF PLMN-IdentityInfo

PLMN-IdentityInfo ::=             SEQUENCE {
    plmn-Identity                     PLMN-Identity,
    cellReservedForOperatorUse        ENUMERATED {reserved, notReserved}
}

SchedulingInfoList ::= SEQUENCE (SIZE (1..maxSI-Message)) OF SchedulingInfo
```

FIG.21

| SystemInformationBlockType1 field descriptions |
|---|
| additional-ns-values |
| A list of additional P-max and NS-values for the band. First *P-maxNS-valueList* contains additional P-max and NS-values corresponding to *freqBandIndicator* in SystemInformationBlockType1. Subsequent *P-maxNS-valueList* correspond to each *additionalSpectrumEmission* included in *multiBandInfoList* in SystemInformationBlockType2, listed in the same order. |
| First pair of values in *P-maxNS-valueList* shall at most include *P-max* corresponding to *additionalSpectrumEmission* included in *freqInfo* or *multiBandInfoList*, subsequent pair of values includes at least *additionalSpectrumEmission*. |
| The UE shall apply the first supported additional spectrum emission in the list of the selected band. If none is supported then UE shall apply *additionalSpectrumEmission* included in *freqInfo* or *multiBandInfoList*. |

FIG.22

```
                        SystemInformationBlockType2 information element
- ASN1START SystemInformationBlockType2 ::=      SEQUENCE {
    ac-BarringInfo                       SEQUENCE {
        ac-BarringForEmergency               BOOLEAN,
        ac-BarringForMO-Signalling           AC-BarringConfig        OPTIONAL,     -- Need OP
        ac-BarringForMO-Data                 AC-BarringConfig        OPTIONAL      -- Need OP
    }                                                                OPTIONAL,     -- Need OP
    radioResourceConfigCommon            RadioResourceConfigCommonSIB,
    ue-TimersAndConstants                UE-TimersAndConstants,
    freqInfo                             SEQUENCE {
        ul-CarrierFreq                       ARFCN-ValueEUTRA        OPTIONAL,     -- Need OP
        ul-Bandwidth                         ENUMERATED {n6, n15, n25, n50, n75, n100}
                                                                     OPTIONAL,     -- Need OP
    [[  ssac-BarringForMMTEL-Voice-r9     AC-BarringConfig           OPTIONAL,     -- Need OP
        ssac-BarringForMMTEL-Video-r9     AC-BarringConfig           OPTIONAL      -- Need OP
    ]],
    [[  ac-BarringForCSFB-r10             AC-BarringConfig           OPTIONAL      -- Need OP
    ]]
}

SystemInformationBlockType2-v8h0-IEs ::=  SEQUENCE {
    multiBandInfoList            SEQUENCE (SIZE (1..maxMultiBands)) OF AdditionalSpectrumEmission
    OPTIONAL,    -- Need OR
    nonCriticalExtension         SystemInformationBlockType2-v9e0-IEs    OPTIONAL   -- Need OP
}

SystemInformationBlockType2-v9e0-IEs ::= SEQUENCE {
    ul-CarrierFreq-v9e0              ARFCN-ValueEUTRA-v9e0        OPTIONAL,     -- Cond ul-FreqMax
    nonCriticalExtension             SystemInformationBlockType2-v10xx-IEsSEQUENCE {}
        OPTIONAL    -- Need OP
}

SystemInformationBlockType2-v10xx-IEs ::= SEQUENCE {
    additional-ns-values                SEQUENCE (SIZE (1..maxMultiBands-Plus1)) OF P-maxNS-
valueList CPTIONAL,    -- Need OR
    nonCriticalExtension         SEQUENCE {}                       OPTIONAL     -- Need OP
}

P-maxNS-valueList ::=                   SEQUENCE {
        p-maxPerNS-value          SEQUENCE (SIZE (1..maxNS-values)) OF P-maxPerNS-value
    }

P-maxPerNS-value ::=              SEQUENCE {
        p-maxNew                   P-Max                            OPTIONAL,    -- Need OP
        additionalSpectrumEmission AdditionalSpectrumEmission       OPTIONAL     -- Need OP
    }

AC-BarringConfig ::=           SEQUENCE {
    ac-BarringFactor                 ENUMERATED {
                                        p00, p05, p10, p15, p20, p25, p30, p40,
```

FIG.23

| SystemInformationBlockType2 field descriptions |
|---|
| *additional-ns-values* <br> A list of additional P-max and NS-values for the band. First *P-maxNS-valueList* contains additional P-max and NS-values corresponding to *freqBandIndicator* in *SystemInformationBlockType1*. Subsequent *P-maxNS-valueList* correspond to each *additionalSpectrumEmission* included in *multiBandInfoList* in *SystemInformationBlockType2*, listed in the same order. <br><br> First pair of values in *P-maxNS-valueList* shall at most include *P-max* corresponding to *additionalSpectrumEmission* included in *freqInfo* or *multiBandInfoList*, subsequent pair of values includes at least *additionalSpectrumEmission*. <br><br> The UE shall apply the first supported additional spectrum emission in the list of the selected band. If none is supported then UE shall apply *additionalSpectrumEmission* included in *freqInfo* or *multiBandInfoList*. |

USER APPARATUS, MOBILE COMMUNICATION SYSTEM, AND SIGNALING VALUE APPLICATION METHOD

TECHNICAL FIELD

The present invention relates to notification of signaling information on maximum transmission power of a user apparatus UE in a mobile communication system.

BACKGROUND ART

In LTE (Long Term Evolution) scheme, out-of-band emission rules and the like are defined such that interference is not exerted to radio systems used in the same area. In general, the rules are defined by domestic regulations of each country, so that communication carriers are required to operate radio systems based on the rules.

On the other hand, it is assumed that, depending on usage of bands or on the system types, there is a case where sufficient attenuation cannot be obtained for allowed interference level to adjacent systems.

Especially, in LTE, since wideband transmission is performed, noise due to spurious tends to reach far-apart frequency with a high level. Thus, there is a case where satisfying the rules is not realistic by suppression using an analog device such as a duplexer.

For dealing with such a case, in the LTE scheme, a rule is specified such that the transmission power of the user apparatus UE may be reduced according to transmission position and the number of RBs (resource blocks). An allowable maximum reduction amount of transmission power is defined as "A-MPR (Additional-Maximum Power Reduction)" (refer to non-patent document 1).

However, since the radio system that should be protected does not always exist in each country and each area, application of the A-MPR is allowed when a specific signal "NS (Network Signaling) value" (to be referred to as NS value hereinafter) is transmitted from a network (base station eNB).

The NS value is a value transmitted by additionalSpectrumEmission of SIB2 (SystemInformationBlockType2) (non-patent document 2). FIG. 1 shows an example of NS values and transmission conditions (Requirements, band, bandwidth, the number of RBs, allowable A-MPR value) (excerpt from Table 6.2.4-1 of non-patent document 1). More specifically, the "transmission condition" is referred to as "additional spectrum emission mask and Additional spurious emissions requirements" (additional spectrum emission and Additional spurious emissions requirements).

For example, when a user apparatus UE that is residing in a cell and that receives NS_05 from the base station eNB uses the number of RBs corresponding to NS_05 of FIG. 1, A-MPR equal to or less than 1 dB is permitted for a transmission power defined in "6.6.3.3.1 Minimum requirement (network signaled value "NS_05")" of the non-patent document 2.

The NS value is defined as necessary for each band (operating band) and channel bandwidth (channel bandwidth). Although the NS value is broadcasted from the network, the value of A-MPR is implemented in the user apparatus UE. Thus, the network side only determines whether to apply it or not, and broadcasts the NS value.

Operation of a user apparatus UE receiving an NS value that is not defined for all channel bandwidths of a band that the user apparatus uses or for a specific channel bandwidth of the band is not specified. However, the user apparatus UE can understand NS_01 (no A-MPR) by default in any band and any channel bandwidth.

RELATED ART DOCUMENT

Non Patent Document

[NON PATENT DOCUMENT 1] 3GPP TS 36.101 V12.4.0 (2014-06)
[NON PATENT DOCUMENT 2] 3GPP TS 36.331 V12.2.0 (2014-06)

SUMMARY OF THE INVENTION

Problem to be Solved by the Invention

In a case where a regulation is newly added after standardization of a band has completed, or where a specific band suddenly comes into use in another country with a specific protection standard, although a new NS value and/or application condition of related A-MPR is specified, a user apparatus UE that is already commercially released cannot understand the new NS value (unexpected NS). Thus, there is a possibility that operation after receiving it is not clear (there is a possibility that the UE does not meet the regulation, or the UE does no camp on the cell).

As a measure for the above-mentioned problem, it can be considered to additionally transmit a new NS value in addition to the existing NS value. However, in a case where a plurality of NS values are transmitted in a cell, for a user apparatus UE that supports any of the NS values, it is unclear which NS value to apply. If one NS value is arbitrarily selected, there is a problem in that, the NS value is different from one that the NW side wants the UE to apply (if applicable) so that there is a possibility in that transmission power control desirable for the NW cannot be executed in the UE. Accordingly, in the conventional technique, there is no mechanism to transmit a plurality of NS values and to control NS values to apply for each UE.

The present invention is contrived in view of the above-mentioned points, and an object of the present invention is to provide a technique to enable a user apparatus to properly select a signaling value to perform control of transmission power in a cell where a plurality of signaling values are transmitted.

Means for Solving the Problem

According to an embodiment of the present invention, there is provided a user apparatus in a mobile communication system including a base station and the user apparatus, including:

reception means configured to receive a plurality of prioritized signaling values corresponding to a band that the user apparatus uses from the base station;

selection means configured to select a signaling value of the highest priority from among signaling values that the user apparatus can apply in the plurality of signaling values; and control means configured to perform control of transmission power by applying the signaling value selected by the selection means.

According to an embodiment of the present invention, there is provided a user apparatus in a mobile communication system including a base station and the user apparatus, including:

reception means configured to receive a plurality of prioritized signaling values from the base station;

selection means configured to select a signaling value of the highest priority from among signaling values that the user apparatus can apply in the plurality of signaling values; and control means configured to perform cell selection or cell reselection by using maximum transmission power corresponding to the signaling value selected by the selection means.

According to an embodiment of the present invention, there is provided a mobile communication system including a base station and a user apparatus, the base station including:

transmission means configured to transmit a plurality of prioritized signaling values corresponding to a band that the user apparatus uses the user apparatus including:

reception means configured to receive the plurality of signaling values from the base station;

selection means configured to select a signaling value of the highest priority from among signaling values that the user apparatus can apply in the plurality of signaling values; and control means configured to perform control of transmission power by applying the signaling value selected by the selection means.

According to an embodiment of the present invention, there is provided a signaling value application method executed by a user apparatus in a mobile communication system including a base station and the user apparatus, including:

a reception step of receiving a plurality of prioritized signaling values corresponding to a band that the user apparatus uses from the base station;

a selection step of selecting a signaling value of the highest priority from among signaling values that the user apparatus can apply in the plurality of signaling values; and a control step of performing control of transmission power by applying the signaling value selected by the selection step.

According to an embodiment of the present invention, there is provided a signaling value application method executed by a mobile communication system including a base station and a user apparatus, including:

a transmission step in which the base station transmits a plurality of prioritized signaling values corresponding to a band that the user apparatus uses;

a reception step in which the user apparatus receives the plurality of signaling values from the base station;

a selection step in which the user apparatus selects a signaling value of the highest priority from among signaling values that the user apparatus can apply in the plurality of signaling values; and a control step in which the user apparatus performs control of transmission power by applying the signaling value selected by the selection step.

Effect of the Present Invention

According to an embodiment of the present invention, it becomes possible that a user apparatus properly select a signaling value so as to perform control of transmission power in a cell where a plurality of signaling values are transmitted.

BRIEF DESCRIPTION OF THE DRAWINGS

FIG. 1 is a diagram showing an example of A-MPR;

FIG. 5A is a diagram showing a SIB1 message;

FIG. 5B is a diagram showing a SIB1 message;

FIG. 6A is a diagram showing a specification change example of a SIB2 message;

FIG. 6B is a diagram showing a specification change example of a SIB2 message;

FIG. 7 is a diagram showing a flowchart of processes in the first embodiment;

FIG. 10 is a diagram showing a flowchart of processes in the second embodiment;

FIG. 11 is a diagram showing a specification change example of a SIB5 message;

FIG. 12 is a diagram showing a specification change example of a SIB5 message;

FIG. 13 is a diagram showing a specification change example of a SIB5 message;

FIG. 14 is a diagram showing a specification change example of a SIB5 message;

FIG. 15 is a diagram showing a specification change example of a SIB3 message;

FIG. 16 is a diagram showing a specification change example of a SIB3 message;

FIG. 17 is a diagram showing a specification change example of a SIB3 message;

FIG. 18 is a diagram showing a specification change example of a SIB3 message;

FIG. 19 is a diagram showing a specification change example of a SIB1 message;

FIG. 20 is a diagram showing a specification change example of a SIB1 message;

FIG. 21 is a diagram showing a specification change example of a SIB1 message;

FIG. 22 is a diagram showing a specification change example of a SIB2 message;

FIG. 23 is a diagram showing a specification change example of a SIB2 message;

EMBODIMENTS FOR CARRYING OUT THE INVENTION

In the following, embodiments of the present invention are described with reference to figures. The embodiments described below are merely examples, and the embodiments to which the present invention is applied are not limited to the embodiments below. Although a mobile communication system of LTE is intended in the present embodiment, the present invention is not limited to LTE, and can be applied to other mobile communication systems. In the specification and the claims, the term "LTE" is used as meaning of schemes of releases on or after release 8 of 3GPP.

(System Whole Configuration)

Figure 2:
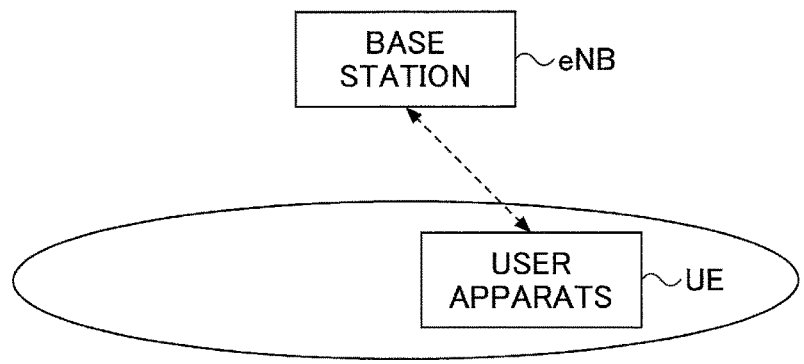
FIG. 2 is a block diagram of a communication system of an embodiment of the present invention.

FIG. 2 shows a block diagram of a communication system in an embodiment of the present invention (common to first and second embodiments). As shown in FIG. 2, the communication system of the present embodiment includes a base station eNB and a user apparatus UE. Although FIG. 2 shows one base station eNB and one user apparatus UE, this is merely an example, and there may be a plurality of base stations eNB and user apparatuses UE.

(Sequence Example)

Figure 3:
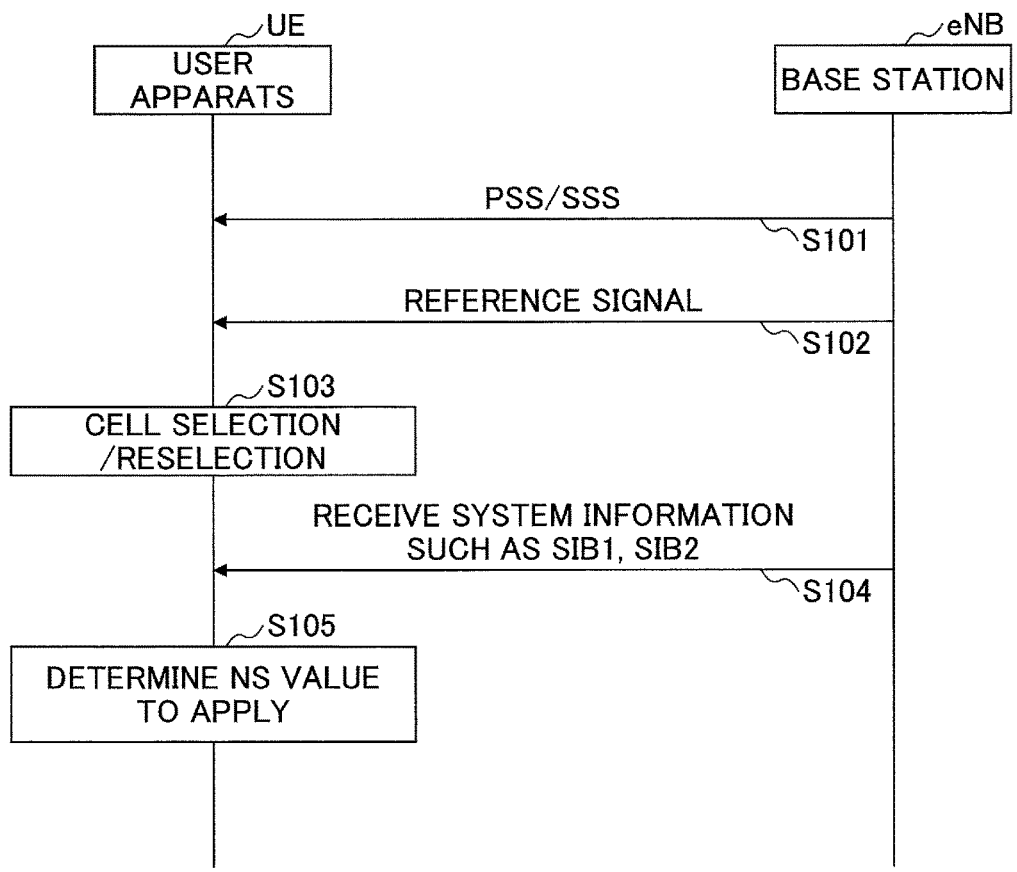
FIG. 3 is a diagram showing a process sequence example in the present embodiment.

In the present embodiment (common to first and second embodiments), since the user apparatus UE determines an NS value to apply based on information included in SIB1, SIB2 that the user apparatus UE receives from the base station eNB, an example of a sequence including reception of SIB1 and SIB2 is described first with reference to FIG. 3. FIG. 3 shows, as an example, an example of operation when performing cell selection/cell reselection in an RRC idle state.

In the example of FIG. 3, the user apparatus UE receives a synchronization signal (PSS/SSS) from the base station eNB by cell search (step 101) so as to establish synchronization and obtain a cell ID (PCI). For the cell synchronized by the synchronization signal, the user apparatus UE receives a reference signal (CRS) from the base station eNB to perform measurement of RSRP (step 102).

In step 103, a cell of the base station eNB is selected as a cell in which RSRP of the reference signal is the highest (best cell).

In step 104, the user apparatus UE receives system information such as SIB1, SIB2 and the like broadcasted (transmitted) from the base station eNB. In step 105, the user apparatus UE determines an NS value that the user apparatus UE applies based on information of a band included in the SIB1 and information of an NS value included in the SIB2.

The user apparatus UE determines a DL channel bandwidth that the user apparatus UE applies in the cell based on DL bandwidth information included in MIB. Also, the user apparatus UE determines a band (operating band) that the user apparatus UE applies in the cell based on band information included in SIB1. Unless UL bandwidth information is included in SIB2, the UL channel bandwidth is regarded to be the same as that of DL. When SIB2 includes UL bandwidth information, the user apparatus UE determines a value broadcasted by SIB2 as the UL channel bandwidth.

In the following, a first embodiment and a second embodiment are described on a transmission method of a plurality NS values and a determination method of an applying NS value in the user apparatus UE.

First Embodiment

First, a first embodiment is described. In this embodiment, the base station eNB transmits, for a band, one or a plurality of additional NS values in addition to an NS value transmitted by additionalSpectrumEmission which is an existing IE.

Priority order is defined for these NS values, and the base station eNB stores an NS value of the lowest priority in the existing additionalSpectrumEmission IE, and stores an NS value of higher priority than the NS value of the lowest priority in additionalEmissionList which is a new IE so as to transmit them.

When the base station eNB stores a plurality of NS values in the additionalEmissionList, for example, the base station eNB associates the order for storing (transmitting) with the priority of the NS values. For example, priority of an NS value stored first in the additionalEmissionList is set to be the highest, and priority is sequentially decreased in storing (transmission) order from the next. Also, for example, priority of an NS value stored first in the additionalEmissionList is set to be the lowest, and priority is sequentially increased in storing (transmission) order from the next. By the way, priority of any NS value in the additionalEmissionList is higher than that of an NS value stored in the existing additionalSpectrumEmission IE.

The user apparatus UE that receives the additionalSpectrumEmission and the additionalEmissionList is provided with a logic (program and processor and the like) for interpreting the above-mentioned rule of priority, so as to determine that an NS value transmitted by the existing additionalSpectrumEmission IE is the lowest priority. Also, as to NS values in the additionalEmissionList, for example, the priority is determined by the order of storing of the NS values.

The user apparatus UE applies an NS value of the highest priority from among a plurality of NS values corresponding to a band that the user apparatus UE uses for communication. That is, the user apparatus UE applies an NS value of the highest priority from among a plurality of NS values that the user apparatus UE supports.

As to a defining method of priority of NS values in a cell, for example, in view of communication schemes and the like of neighboring systems of the cell, an NS value corresponding to the optimum transmission condition is set to be the highest priority, after that, NS values are defined by sequentially lowering the priority as transmission conditions that are not the optimal but can be compromised. The NS value stored in the existing additionalSpectrumEmission IE is NS_01 that can be understood by every user apparatus UE, for example.

Figure 4:
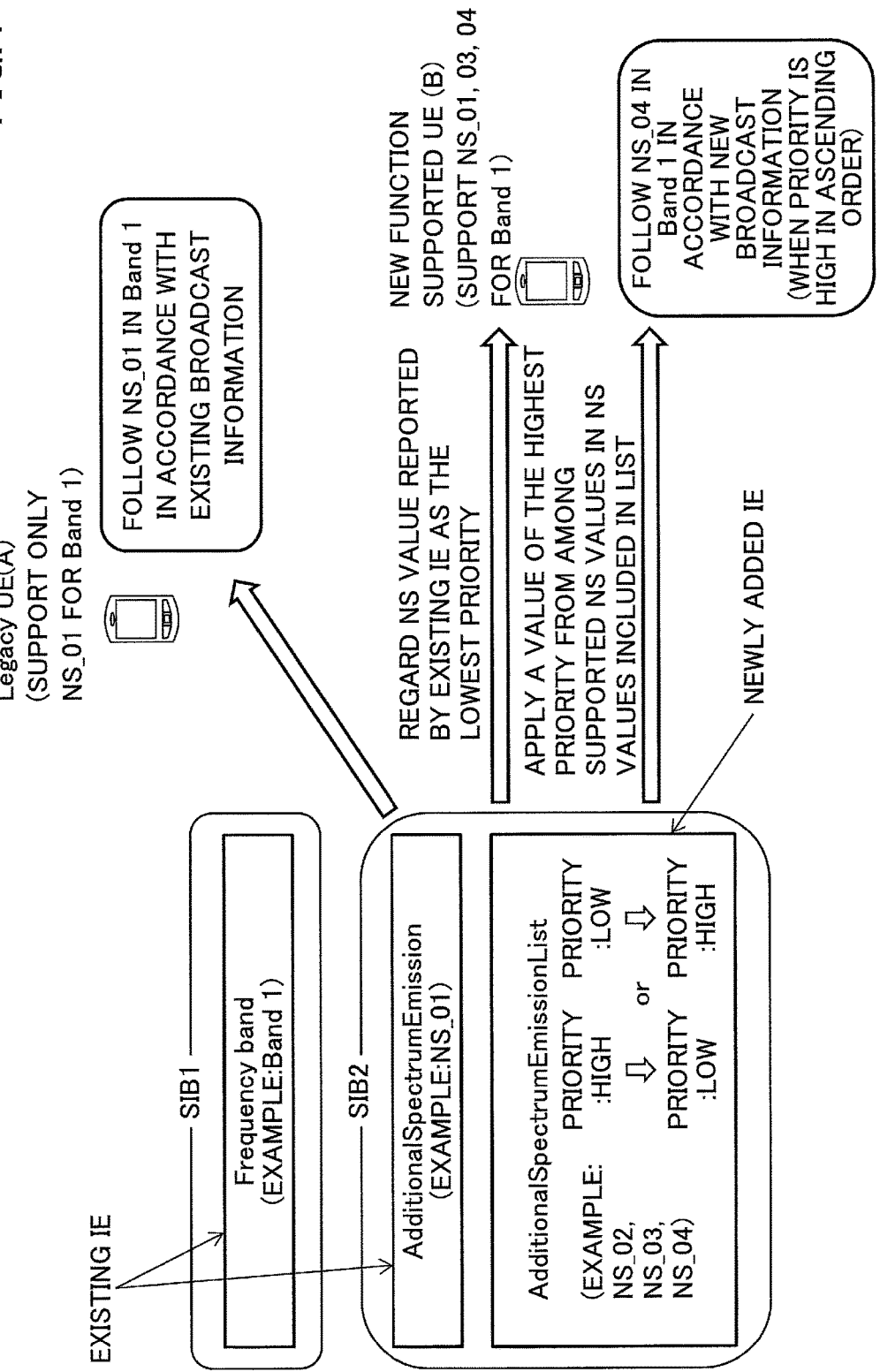
FIG. 4 is a diagram for explaining a transmission method and an application method of an NS value in a first embodiment.

An example of a transmission method and an application method of an NS value of the present embodiment is described with reference to FIG. 4. In the example of FIG. 4, band 1 is transmitted from the base station eNB using SIB1, so that each UE (UE-A and UE-B in FIG. 4) under the cell uses the band 1.

Also, by the additionalSpectrumEmission of SIB2, NS_01 is transmitted as an NS value of the lowest priority for the band 1, and by the additionalEmissionList, a plurality of NS values for the band 1 are transmitted. In the example of FIG. 4, listed position (order) in the additionalEmissionList is associated with priority of the NS value.

In the example of FIG. 4, since the UE-A does not support NS values other than NS_01 for the band 1, the UE-A applies NS_01. Since the UE-B supports NS_01, 03, and 04 for the band 1, the UE-B applies an NS value of the highest priority from among these. For example, in the additionalEmissionList, assuming that the higher the priority is, the rearer the position is (assuming that the priority is high in an ascending order), in the example of FIG. 4, the UE-B applies NS_04. Also, in reverse, assuming that the lower the priority is, the rearer the position is (assuming that the priority is in a descending order), in the example of FIG. 4, the UE-B applies NS_03 which is the first NS value that the user apparatus UE supports.

<3GPP Specification Example>

Next, description examples (excerpts) of the 3GPP specification (3GPP TS 36.331) that the communication system, that supports operation described in the present embodiment, should comply with are described with reference to FIGS. 5A, 5B, and FIGS. 6A and 6B. In FIGS. 5A, 5B, and FIGS. 6A and 6B, as to FIGS. 5A and 5B, there is no change from the existing specification (non-patent document 2), and, in FIGS. 6A and 6B, portions changed from the non-patent document 2 are underlined.

FIG. 5A shows an excerpt from a SIB1 message (SystemInformationBlockType1 message). In FIG. 5A, freqBandIndicator indicated by "A" corresponds to an IE for notifying of band 1 shown in FIG. 4 as an example.

By the way, in LTE, a function called Multiple Frequency Band Indicator (MFBI) is defined such that, when a plurality of bands whose frequency regions overlap are defined, UEs supporting each band can be connected to the network at the same time. The multiBandInfoList indicated by "B" of FIG. 5A is an IE for notifying of the plurality of bands. Description of the multiBandInfoList is shown in FIG. 5B.

FIG. 6A shows an excerpt of a SIB2 IE (SystemInformationBlockType2 information element). As sown in FIG. 6A, additionalSpectrumEmissionList, and multiBandInfoList2 are added. Descriptions of these are shown in FIG. 6B.

The additionalSpectrumEmissionList corresponds to one shown as the newly added IE in FIG. 4, and is a list of NS values corresponding to a band indicated by the freqBandIndicator of SIB1 (or a band in multiBandInfoList). The description of FIG. 6B is an example in a case where NS values are listed in an order from "high" to "low" in priority. In this case, the UE applies an NS value appearing first in the list from among NS values that the user apparatus UE supports. In a case where NS values are listed in an order from "low" to "high", "first" is replaced with "last" in the corresponding part of the description in FIG. 6B. In this case, the UE applies an NS value that appears last in the list from among NS values that the user apparatus UE supports.

As described before, when a plurality of bands where frequency regions overlap are defined, a plurality of bands are notified by the multiBandInfoList. In this case, in SIB2, a plurality of NS values (existing additionalSpectrumEmission) for the bands can be notified by the region of the multiBandInfoList. This is an existing function, and is related to the second embodiment. Thus, it is described in the second embodiment in more detail.

The multiBandInfoList2 that is a new IE shown in FIGS. 6A and 6B is an IE for notifying of additional NS values corresponding to each band of a plurality of bands in a case where the plurality of bands are notified by the multiBandInfoList of SIB1. In the multiBandInfoList2, additionalSpectrumEmissionList corresponding to each band is included.

<Process Flow>

Next, a process procedure example of the user apparatus UE is described with reference to a flowchart of FIG. 7. FIG. 7 is a flow showing processes in which the user apparatus UE receives system information and determines an NS value to apply.

In step 201, the user apparatus UE receives SIB1, and selects a band transmitted by FreqBandIndicator (if multiBandInfoList is broadcasted, it is included) (step 201).

In step 202, the user apparatus UE receives SIB2. If the user apparatus UE detects additionalSpectrumEmissionList (if there is multiBandInfoList2, additionalSpectrumEmissionList in it is included) from the SIB2, the process goes to step 203, and if it is not detected, the process goes to step 205. Here, the case where it is not detected includes a case where these IEs are not transmitted from the base station eNB and a case where the user apparatus UE does not have a function for interpreting the IEs.

In steps 203 and 204, the user apparatus UE selects an NS value to apply for the band that the user apparatus UE applies. In step 203, the user apparatus UE determines the additionalSpectrumEmission (independent additionalSpectrumEmission or additionalSpectrumEmission in the multiBandInfoList) for the band broadcasted by the SIB2 to be an NS value of the lowest priority.

In step 204, the user apparatus UE regards priority of NS values in the additionalSpectrumEmissionList as priority high→low priority (or the reverse) in an ascending order of arranging order in the list, and applies an NS value of the highest priority from among NS values that the UE supports including the existing lowest priority NS value.

When the determination result in step 202 is No, the user apparatus UE applies an NS value of the existing additionalSpectrumEmission for the band transmitted by the SIB2 in step 205.

Second Embodiment

Figure 8:
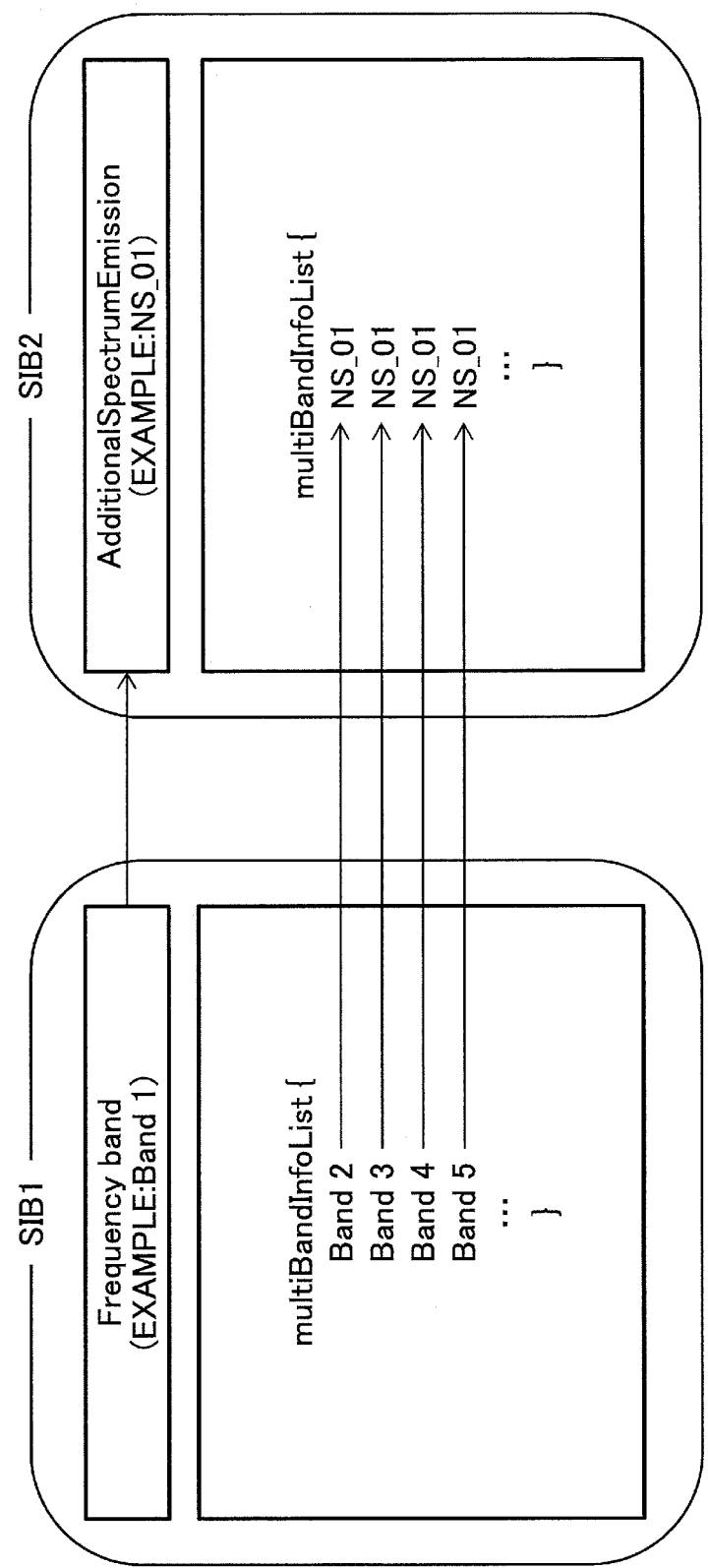
FIG. 8 is a diagram for explaining a transmission method of an NS value in a multiBandInfoList region.

Next, a second embodiment is described. As described before, in LTE, a function called Multiple Frequency Band Indicator (MFBI) is defined such that, in a case where a plurality of bands in which frequency regions overlap are defined, UEs supporting each band can be connected simultaneously to the network, and the plurality of bands can be notified by the multiBandInfoList of SIB1. In this case, as shown in FIG. 8, NS values for each band can be notified by the region of the multiBandInfoList.

In the second embodiment, the base station eNB transmits a plurality of NS values per one band by utilizing the function of the MFBI. In the same way as the first embodiment, the plurality of NS values are associated with priorities, so that the user apparatus UE selects and applies an NS value of the highest priority from among NS values that the user apparatus UE supports in the plurality of NS values received from the base station eNB.

Figure 9:
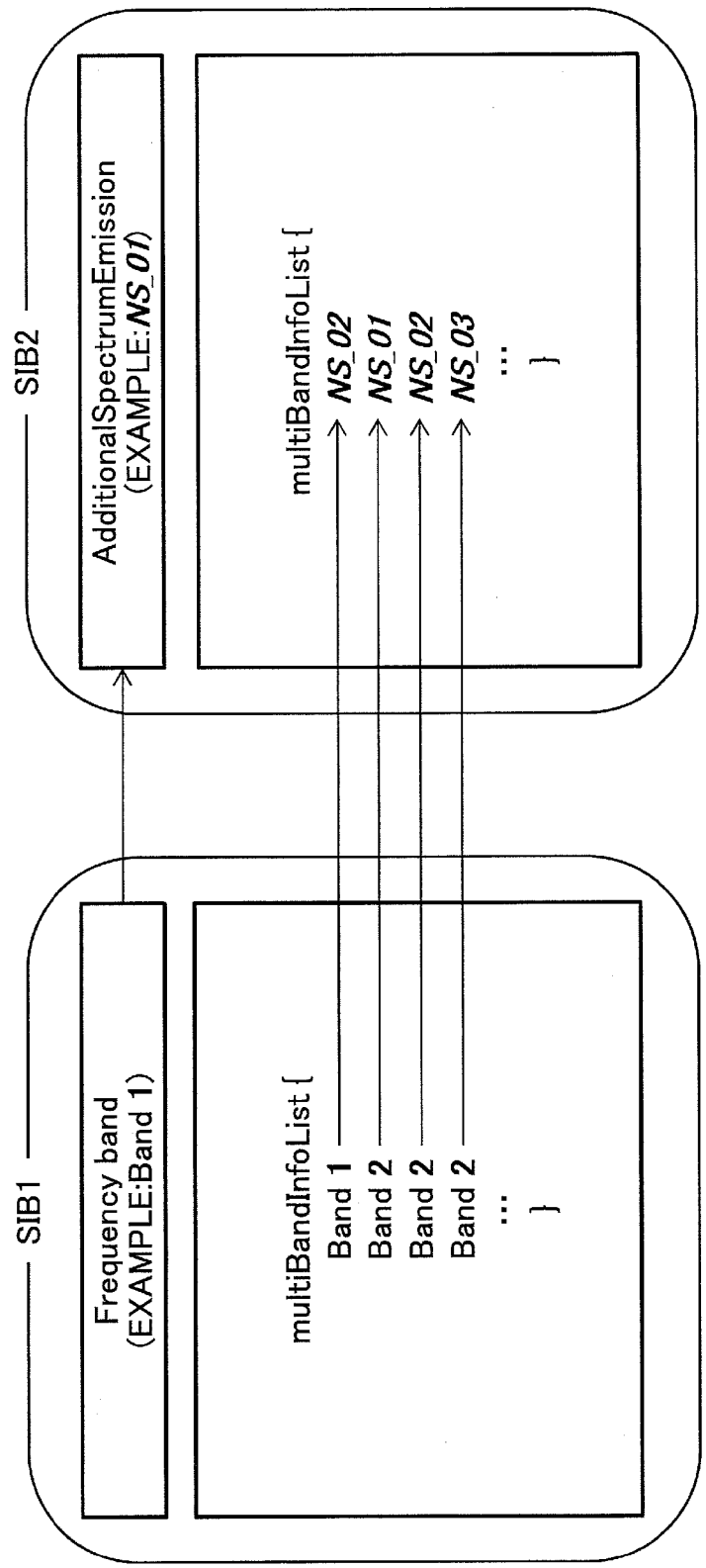
FIG. 9 is a diagram for explaining a transmission method of an NS value in a second embodiment.

An example of a transmission method of the plurality of NS values in the second embodiment is described with reference to FIG. 9. As shown in FIG. 9, the base station eNB stores (a value indicating) one band in the freqBandIndicator and in the multiBandInfoList of SIB1 redundantly to transmit them. In the example of FIG. 9, band 1 is stored in the freqBandIndicator and also band 1 is stored in the multiBandInfoList. In the multiBandInfoList of SIB1, band 2 is further stored redundantly.

In SIB2, the additionalSpectrumEmission stores an NS value of the lowest priority from among NS values corresponding to the band of the freqBandIndicator. FIG. 9 shows NS_01 as an example of the NS value of the lowest priority.

In the multiBandInfoList of SIB2, in the same order (same storing position) as the storing order (storing position) of (information indicating) bands in the multiBandInfoList of SIB1, NS values corresponding to the bands are stored. For example, in the example of FIG. 9, an NS value corresponding to a band (band 1) first listed in the multiBandInfoList of SIB1 is an NS value (NS_02) listed first in the multiBandInfoList of SIB2.

In the second embodiment, an NS value of the lowest priority corresponding to a band of the freqBandIndicator is stored in the existing additionalSpectrumEmission IE, and an NS value of higher priority corresponding to the band is stored in the multiBandInfoList of SIB2. In the example of FIG. 9, NS_02 is higher than NS_01 in priority for band 1.

Also, a plurality of NS values corresponding to band 2 that is redundantly stored in the multiBandInfoList of SIB1, are associated with storing positions of the band in the multiBandInfoList of SIB1, and are stored in the multiBandInfoList of SIB2. The user apparatus can obtain a plurality of NS values corresponding to band 2 from the storing positions. In the example of FIG. 9, NS values of band 2 are stored in positions from a second listed position to a fourth listed position in the multiBandInfoList of SIB2 in association with the multiBandInfoList of SIB1.

When a plurality of NS values are stored per one band in the multiBandInfoList, for example, the storing order is associated with priorities of NS values like the first embodiment. For example, in the multiBandInfoList, as to a band, priority of an NS value stored first is set to be the highest, and priority is sequentially decreased in storing (transmitting) order from the next. Also, for example, in the multiBandInfoList, as to a band, priority of an NS value stored first is set to be the lowest, and priority is sequentially increased in storing (transmitting) order from the next. For example, in the latter case, in NS values: NS_01, 02 and 03 of band 2 shown in FIG. 9, priority of NS_01 is the lowest, and priority of NS_03 is the highest.

<Process Flow>

Next, a process procedure example of the user apparatus UE in the second embodiment is described with reference to a flowchart of FIG. 10. FIG. 10 is a flow showing processes in which the user apparatus UE receives system information and determines an NS value to apply.

In step 301, the user apparatus UE receives SIB1, and selects a band transmitted by FreqBandIndicator (if multiBandInfoList is broadcasted, it is included) (step 301).

In step 302, the user apparatus UE determines whether the band that the user apparatus UE uses is received redundantly in the FreqBandIndicator and the multiBandInfoList, or in the multiBandInfoList. If it is received redundantly, the process goes to step 303, and if it is not received redundantly, the process goes to step 305.

In steps 303 and 304, the user apparatus UE selects an NS value to apply for the band that the user apparatus UE applies. In step 303, when there is an NS value transmitted by the existing additionalSpectrumEmission in NS values for the band redundantly transmitted by SIB2, the user apparatus determines it to be an NS value of the lowest priority.

In step 304, the user apparatus UE regards priority of NS values in the multibandinfoList of SIB2 as priority high→low priority (or the reverse) in an ascending order of arranging order in the list, and applies an NS value of the highest priority from among NS values that the UE supports including the existing lowest priority NS value (additionalSpectrumEmission) if it exists.

When the determination result in step 302 is No, the user apparatus UE applies an NS value of the additionalSpectrumEmission for the band broadcasted by SIB2 in step 305.

(On p-Max)

In the first and the second embodiments, for example, considering that there is a user apparatus UE that can apply only an NS value of low priority, in order that transmission power from the user apparatus UE does not exert bad effect to neighboring systems, p-Max corresponding to each NS value may be defined and broadcasted by SIB1, and the user apparatus UE may apply p-Max corresponding to an NS value that the user apparatus UE applies. The maximum transmission power broadcasted by p-Max is used as $P_{EMAX}$ as shown in 6.2.5 of the non-patent document 1, so that control of transmission power is performed in the user apparatus UE.

For example, in the methods described in the first and the second embodiments, as to a band that the user apparatus UE applies, when the base station eNB transmits NS_01, NS_03 and NS_50, the base station eNB transmits p-Max1, p-Max2 and p-Max3, by SIB1, as p-Max corresponding to NS_01, NS_03 and NS_50 respectively. Then, when the user apparatus UE applies NS_50, the user apparatus UE applies p-Max3 corresponding to NS_50. As to p-Max corresponding to the NS value (NS_01) of the lowest priority, the exiting p-Max may be utilized without defining a new signaling.

Also, in the present embodiment, it is not essential to use p-Max notified from the base station eNB. The user apparatus UE may perform transmission power control by using a value corresponding to the maximum transmission power that is predetermined in the user apparatus UE.

(Modified Example)

In the examples so far, it was described that the user apparatus UE receives SIB1, SIB2 and the like in a cell where the user apparatus UE camped on by a procedure of cell selection/cell reselection so as to determine the maximum transmission power and the like of the cell based on information included in these.

In the communication system of the present embodiment (assuming LTE), as the cell reselection, there are same frequency cell reselection (intra-frequency cell reselection) and different frequency cell reselection (inter-frequency cell reselection).

In the same frequency cell reselection, when received power/reception quality of a reference signal in a cell (serving cell) where the user apparatus UE resides becomes equal to or less than a predetermined value, the user apparatus UE starts measurement of received power/reception quality in a neighboring cell of a frequency the same as the frequency (that may be referred to as carrier frequency) of the cell, so as to determine whether to transit to the neighboring cell based on the measurement result.

On the other hand, in the different frequency cell reselection, the user apparatus UE performs measurement of a neighboring cell of a frequency different from the frequency of the cell where the user apparatus UE resides based on priority and the like so as to determine whether to transit to the neighboring cell based on the measurement result. In the different frequency cell reselection, information included in SIB5 (System information Block Type 5) that is one of a plurality of types of system information transmitted from the base station eNB to the user apparatus UE (non-patent document 2) is used.

In the existing SIB5 described in the non-patent document 2, there is "InterFreqCarrierFreqInfo" for each frequency of neighboring cells. The "InterFreqCarrierFreqInfo" includes a frequency (a value of a field of dl-CarrierFreq), a maximum transmission power (a value of a field of p-Max), priority (a value of a field of cellReselectionPriority), various thresholds (values of fields of threshX-High, threshX-Low and the like).

The above-mentioned value of p-Max is one of parameters used in a determination condition for determining a transition destination cell (target cell).

However, in the conventional technique, since SIB5 does not include an NS value of the target cell. Thus, there is a possibility in that the above-mentioned p-Max is not an optimum value for selecting a target cell.

Thus, in this modified example, SIB5 includes, for each frequency of neighboring cells, a plurality of NS values and values of P-Max corresponding to each of the plurality of NS values such that the user apparatus UE can properly determine a transition destination cell in different frequency cell reselection.

The plurality of NS values for each frequency are transmitted from the base station eNB to the user apparatus UE as a list in which the NS values are arranged in a decreasing order of priority, for example. Also, the plurality of p-Maxes corresponding to the plurality of NS values are notified as a list in which p-Maxes are arranged in the same order as the arranged order of NS values in the list of NS values. Also, an NS value and a value of p-Max corresponding to the NS value are set as a pair, so that a list in which the pairs are arranged in a descending order of priority may be included in SIB5, and transmitted from the base station eNB to the user apparatus UE.

As to the way for arranging the values in the list, descending order of priority is an example, and ascending order of priority may be used.

As an example, in a case where different frequencies notified by SIB5 are frequency 1 and frequency 2, "(NS value 1, P-Max1), (NS value 2, P-Max2), (NS value 3, P-Max3)" is included in SIB5 for the frequency 1 and "(NS value 1, P-Max1), (NS value 4, P-Max4), (NS value 5, P-Max5)" is included in SIB5 for the frequency 2. For example, "(NS value 1, P-Max1)" indicates that NS value 1 is associated with p-Max 1.

In different frequency cell reselection, in a case where the user apparatus UE that receives the above-mentioned list included in SIB5 determines whether to transit to a cell of "frequency 1", for example, the user apparatus UE refers to a list of NS values (or a list of pairs of NS values and p-Maxes) corresponding to "frequency 1", so as to select an NS value of the highest priority from among NS values that the user apparatus UE can apply in "frequency 1", and further, select a p-Max corresponding to the NS value, then, perform determination by applying the selected p-Max.

For example, in a case where the list corresponding to the frequency 1 is "(NS value 1, P-Max1), (NS value 2, P-Max2), (NS value 3, P-Max3)", when the user apparatus UE supports NS value 2 and NS value 3, and when NS value 2 is higher than NS value 3 in priority, the user apparatus UE selects the NS value 2, and determines whether to transit to the cell of frequency 1 using P-Max2 corresponding to this.

When there is no p-Max corresponding to the selected NS value in SIB5, the user apparatus UE can apply p-Max in "InterFreqCarrierFreqInfo".

FIG. 11 and FIG. 12 show description examples (excerpts) of a 3GPP specification (3GPP TS 36.331) corresponding to the modified example on SIB5. In FIG. 11 and FIG. 12, portions changed from the non-patent document 2 are underlined.

FIG. 11 shows an excerpt of SIB5 (SystemInformationBlockType5 information element). As shown in FIG. 11, multiMPR-InfoList is added as a list of MPR-Info. The multiMPR-InfoList is included for each frequency of neighboring cells. As indicated by the description of FIG. 12, in this example, multiMPR-InfoList is a list in which pairs of additionalSpectrumEmission (NS value) and a value of p-Max corresponding to it are arranged in the order of priority. If p-Max is absent in MPR-Info, the user apparatus UE applies p-Max in InterFreqCarrierFreqInfo. Also, when the user apparatus UE does not support any additionalSpectrumEmission (NS value) in the list, the user apparatus UE applies p-Max in InterFreqCarrierFreqInfo.

Other description examples (excepts) of the 3GPP specification (3GPP TS 36.331) corresponding to the modified example on SIB5 are shown in FIG. 13 and FIG. 14. In FIG. 13 and FIG. 14, portions changed from the non-patent document 2 are underlined.

FIG. 13 shows an excerpt of SIB5 (SystemInformationBlockType5 information element). As shown in FIG. 13, additional-ns-values that is a list of P-maxNS-valueList is added. As shown in FIG. 14, the first P-maxNS-valueList includes a list of pairs of P-max and NS-value corresponding to freqBandIndicator in SIB1. The following P-maxNS-valueList corresponds to each additionalSpectrumEmission included in multiBandInfoList in SIB2.

Each P-maxNS-valueList is a list arranging pairs of additionalSpectrumEmission (NS value) and a value of p-Max corresponding to it in a descending order of priority. The user apparatus UE applies the first additionalSpectrumEmission (NS value) that the user apparatus UE supports in the list.

In the above-mentioned example, SIB5 that is used for different frequency cell reselection has been described. As to the same frequency cell reselection (intra-frequency cell re-selection), the value of p-Max used for determining whether to transit to a target cell is included in SIB3.

Like the case of SIB5, since the existing SIB3 does not include an NS value of a target cell. Thus, there is a possibility in that the above-mentioned p-Max is not an optimum value for selecting a target cell.

Thus, in this modified example, SIB3 includes a plurality of NS values for transition destination cells (neighboring cells) and values of P-Max corresponding to each of the plurality of NS values such that the user apparatus can properly determine a transition destination cell.

The plurality of NS values included in SIB3 are transmitted from the base station eNB to the user apparatus UE as a list in which the NS values are arranged in a decreasing order of priority, for example. Also, the plurality of p-Maxes corresponding to the plurality of NS values are notified as a list in which p-Maxes are arranged in the same order as the arranged order of NS values in the list of NS values. Also, an NS value and a value of p-Max corresponding to the NS value may be set as a pair, so that a list in which the pairs are arranged in a descending order of priority may be included in SIB3, and transmitted from the base station eNB to the user apparatus UE.

As to the way for arranging the values in the list, descending order of priority is an example, and ascending order of priority may be used.

As an example, "(NS value 1, P-Max1), (NS value 2, P-Max2), (NS value 3, P-Max3)" is included in SIB3 as a list of pairs of NS value and p-Max that can be applied in a transition destination cell.

In same frequency cell reselection, in a case where the user apparatus UE that receives the above-mentioned list included in SIB3 determines whether to transit to another cell of the same frequency, the user apparatus UE refers to a list of NS values (or a list of pairs of NS values and p-Maxes) in SIB3, so as to select an NS value of the highest priority from among NS values that the user apparatus UE can apply, and further, selects a p-Max corresponding to the NS value, then, performs determination by applying the selected p-Max.

When there is no p-Max corresponding to the selected NS value in SIB3, the user apparatus UE can apply p-Max in "intraFreqCellReselectionInfo".

FIG. 15 and FIG. 16 show description examples (excerpts) of a 3GPP specification (3GPP TS 36.331) corresponding to the modified example on SIB3. In FIG. 15 and FIG. 16, portions changed from the non-patent document 2 are underlined.

FIG. 15 shows an excerpt of SIB3 (SystemInformationBlockType3 information element). As shown in FIG. 15, multiMPR-InfoList is added as a list of MPR-Info. As shown in FIG. 16, in this example, multiMPR-InfoList is a list in which pairs of additionalSpectrumEmission (NS value) and a value of p-Max corresponding to it are arranged in the order of priority. If p-Max is absent in MPR-Info, the user apparatus UE applies p-Max in intraFreqCellReselectionInfo. Also, when the user apparatus UE does not support any additionalSpectrumEmission (NS value) in the list, the user apparatus UE applies p-Max in intraFreqCellReselectionInfo.

Other description examples (excepts) of the 3GPP specification (3GPP TS 36.331) corresponding to the modified example on SIB3 are shown in FIG. 17 and FIG. 18. In FIG. 17 and FIG. 18, portions changed from the non-patent document 2 are underlined.

FIG. 17 shows an excerpt of SIB3 (SystemInformationBlockType3 information element). As shown in FIG. 17, additional-ns-values that is a list of P-maxNS-valueList is added. As shown in FIG. 18, the first P-maxNS-valueList includes a list of pairs of P-max and NS-value corresponding to freqBandIndicator in SIB1. The following P-maxNS-valueList corresponds to each additionalSpectrumEmission included in multiBandInfoList in SIB2.

Each P-maxNS-valueList is a list arranging pairs of additionalSpectrumEmission (NS value) and a value of p-Max corresponding to it in a descending order of priority. The user apparatus UE applies the first additionalSpectrumEmission (NS value) that the user apparatus UE supports in the list.

In the same way as the above-mentioned SIB5 and SIB3, it is also possible that the base station eNB transmits a plurality of NS values and a plurality of p-Max values together by using SIB1 or SIB2. That is, in the before-mentioned embodiment, an example has been described in which a plurality of NS values are transmitted by SIB2, and a plurality of p-Max values are transmitted by SIB1. On the other hand, in the modified example, a plurality of NS values are transmitted together with a plurality of p-Max values using SIB1 or SIB2.

The plurality of NS values are included in SIB1 as a list in which the NS values are arranged in a decreasing order of priority, for example. Also, the plurality of p-Maxes corresponding to the plurality of NS values are included in SIB1 or SIB2 as a list in which p-Maxes are arranged in the same order as the arranged order of NS values in the list of NS values. Also, an NS value and a value of p-Max corresponding to the NS value may be set as a pair, so that a list in which the pairs are arranged in a descending order of priority may be included in SIB1 or SIB2, and transmitted from the base station eNB to the user apparatus UE.

As to the way for arranging the values in the list, descending order of priority is an example, and ascending order of priority may be used.

As an example, "(NS value 1, P-Max1), (NS value 2, P-Max2), (NS value 3, P-Max3)" is included for a band in SIB1 or SIB2. For example, "(NS value 1, P-Max1)" indicates that NS value 1 is associated with p-Max 1.

In a case where the user apparatus UE that receives the above-mentioned list included in SIB1 or SIB2 applies the band in the cell, the user apparatus UE refers to a list of NS values (or a list of pairs of NS values and p-Maxes) corresponding to the band, so as to select an NS value of the highest priority from among NS values that the user apparatus UE can apply in the band, and further, select a p-Max corresponding to the NS value, then, perform transmission control by applying the selected p-Max.

For example, in a case where the list corresponding to the band that the user apparatus UE applies is "(NS value 1, P-Max1), (NS value 2, P-Max2), (NS value 3, P-Max3)", when the user apparatus UE supports NS value 2 and NS value 3, and when NS value 2 is higher than NS value 3 in priority, the user apparatus UE selects the NS value 2, and performs control of maximum transmission power using the NS value 2 and P-Max2 corresponding to this.

When there is no p-Max corresponding to the selected NS value in SIB1 or SIB2, the user apparatus UE can apply an existing p-Max included in SIB1.

FIG. 19 shows a description example (excerpts) of a 3GPP specification (3GPP TS 36.331) corresponding to the modified example on SIB1. In FIG. 19, portions changed from the non-patent document 2 are underlined.

FIG. 19 shows an excerpt of SIB1 (SystemInformationBlockType1 information element). As shown in FIG. 19, multiMPR-InfoList is added as a list of MPR-Info. In this example, multiMPR-InfoList is a list in which pairs of additionalSpectrumEmission (NS value) and a value of p-Max corresponding to it are arranged in the order of priority. If p-Max is absent in MPR-Info, the user apparatus UE applies the existing p-Max. Also, when the user apparatus UE does not support any additionalSpectrumEmission (NS value) in the list, the user apparatus UE applies the existing p-Max.

The user apparatus UE can also perform cell selection using p-Max corresponding to the NS value selected from the plurality of NS values transmitted by SIB1.

Other description examples (excepts) of the 3GPP specification (3GPP TS 36.331) corresponding to the modified example on SIB1 are shown in FIG. 20 and FIG. 21. In FIG. 20 and FIG. 21, portions changed from the non-patent document 2 are underlined.

FIG. 20 shows an excerpt of SIB1 (SystemInformationBlockType1 information element). As shown in FIG. 20, additional-ns-values that is a list of P-maxNS-valueList is added. As shown in FIG. 21, the first P-maxNS-valueList includes a list of pairs of P-max and NS-value corresponding to freqBandIndicator in SIB1. The following P-maxNS-valueList corresponds to each additionalSpectrumEmission included in multiBandInfoList in SIB2.

Each P-maxNS-valueList is a list arranging pairs of additionalSpectrumEmission (NS value) and a value of p-Max corresponding to it in a descending order of priority. The user apparatus UE applies the first additionalSpectrumEmission (NS value) that the user apparatus UE supports in the list.

Description examples (excepts) of the 3GPP specification (3GPP TS 36.331) corresponding to the modified example on SIB2 are shown in FIG. 22 and FIG. 23. In FIG. 22 and FIG. 23, portions changed from the non-patent document 2 are underlined.

FIG. 22 shows an excerpt of SIB2 (SystemInformationBlockType2 information element). As shown in FIG. 22, additional-ns-values that is a list of P-maxNS-valueList is added. As shown in FIG. 23, the first P-maxNS-valueList includes a list of pairs of P-max and NS-value corresponding to freqBandIndicator in SIB1. The following P-maxNS-valueList corresponds to each additionalSpectrumEmission included in multiBandInfoList in SIB2.

Each P-maxNS-valueList is a list arranging pairs of additionalSpectrumEmission (NS value) and a value of p-Max corresponding to it in a descending order of priority. The user apparatus UE applies the first additionalSpectrumEmission (NS value) that the user apparatus UE supports in the list.

(Apparatus Configuration)

Next, configuration examples of the user apparatus UE and the base station eNB in the embodiments (including the first and the second embodiments, operation of p-Max, and modified examples) of the present invention are shown. In the following, although it is assumed that each apparatus has both functions of the first and the second embodiments, each apparatus may has only one of the functions. In a case where the apparatus has both functions of the first and the second embodiments, for example, it can be changed by setting whether the first embodiment or the second embodiment is applied. Further, each apparatus may include the function of the modified examples without including any function of the first and the second embodiments, may include the function of the modified examples in addition to both functions of the first and the second embodiments, may include the function of the modified examples in addition to one of the functions of the first and the second embodiments.

<User Apparatus UE>

Figure 24:
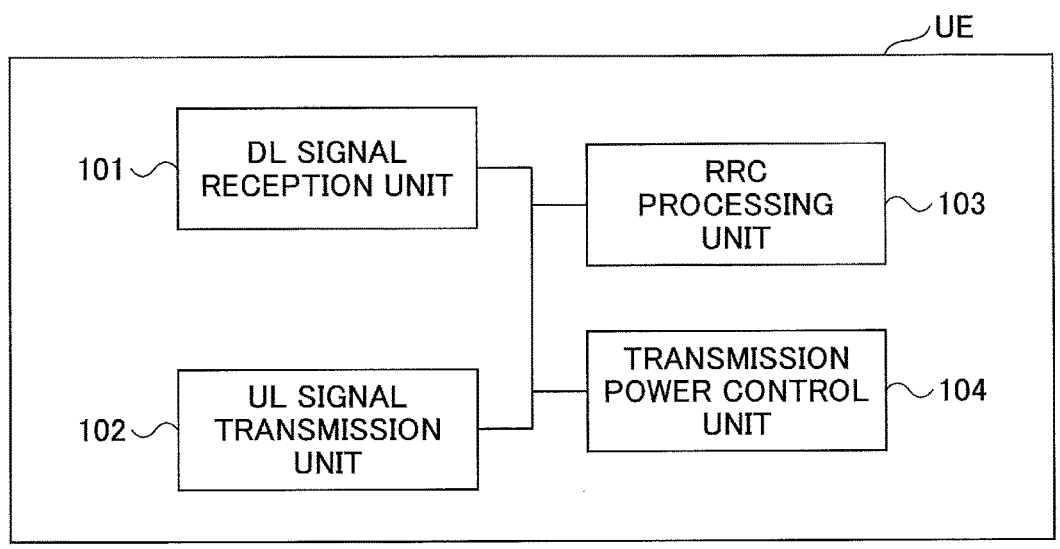
FIG. 24 is a block diagram of a user apparatus UE.

FIG. 24 shows a functional block diagram of the user apparatus UE. As shown in FIG. 24, the user apparatus UE includes a DL signal reception unit 101, an UL signal transmission unit 102, an RRC processing unit 103, an a transmission power control unit 104. FIG. 24 shows only functional units especially related to the present invention in the user apparatus UE, and the user apparatus UE includes functions not shown in the figure for at least performing operation complying with LTE.

The DL signal reception unit 101 includes functions configured to receive various downlink signals from the base station eNB, and obtains information of an upper layer from the received physical layer signals. The UL signal transmission unit 102 includes functions configured to generate various signals of physical layer from information of an upper layer that should be transmitted from the user apparatus UE so as to transmit the signals to the base station eNB. Also, the DL signal reception unit 101 includes a function configured to execute cell selection and cell reselection. That is, the DL signal reception unit 101 includes a control unit configured to select a signaling value of the highest priority from among signaling values that the user apparatus UE can apply in a plurality of signaling values included in system information, and to perform cell selection or cell reselection using the maximum transmission power corresponding to the signaling value. The control unit may be provided in the outside of the DL signal reception unit 101. For example, the control unit may be provided as a part of the function of the transmission power control unit 104.

The RRC processing unit 103 performs reception of SIB1, SIB2, SIB3, SIB5 and the like described in the present embodiment and the modified examples and performs reading of the IEs, and also, as described with reference to FIG. 3, FIG. 4, FIGS. 7-23 and the like, the RRC processing unit 103 includes a function configured to determine a band to apply, and to select an NS value to apply from among a plurality of NS values corresponding to the band and a function configured to obtain p-Max corresponding to the applying NS value from SIB1 and the like, and the like. That is, the RRC processing unit 103 includes selection means (selection unit) configured to select a signaling value of the highest priority from among signaling values that the user apparatus UE can apply in a plurality of signaling values corresponding to a band applied by the user apparatus UE. Also, the RRC processing unit 103 includes a function configured to perform processing and the like for determining the NS value and the p-Max in the modified example.

The transmission power control unit 104 performs control of transmission power based on the applying NS value determined by the RRC processing unit 103 and the corresponding maximum transmission power (p-Max). In transmission power control to which the NS value is applied, for example, the transmission power control unit 104 executes transmission power reduction of A-MPR allowed for the NS value when using the number of RBs and the like defined for the NS value.

The configuration of the user apparatus UE shown in FIG. 24 may be realized by hardware circuits (example: one or a plurality of IC chips) as a whole, or may be realized by hardware circuits for a part and by a CPU and a program for other parts.

Figure 25:
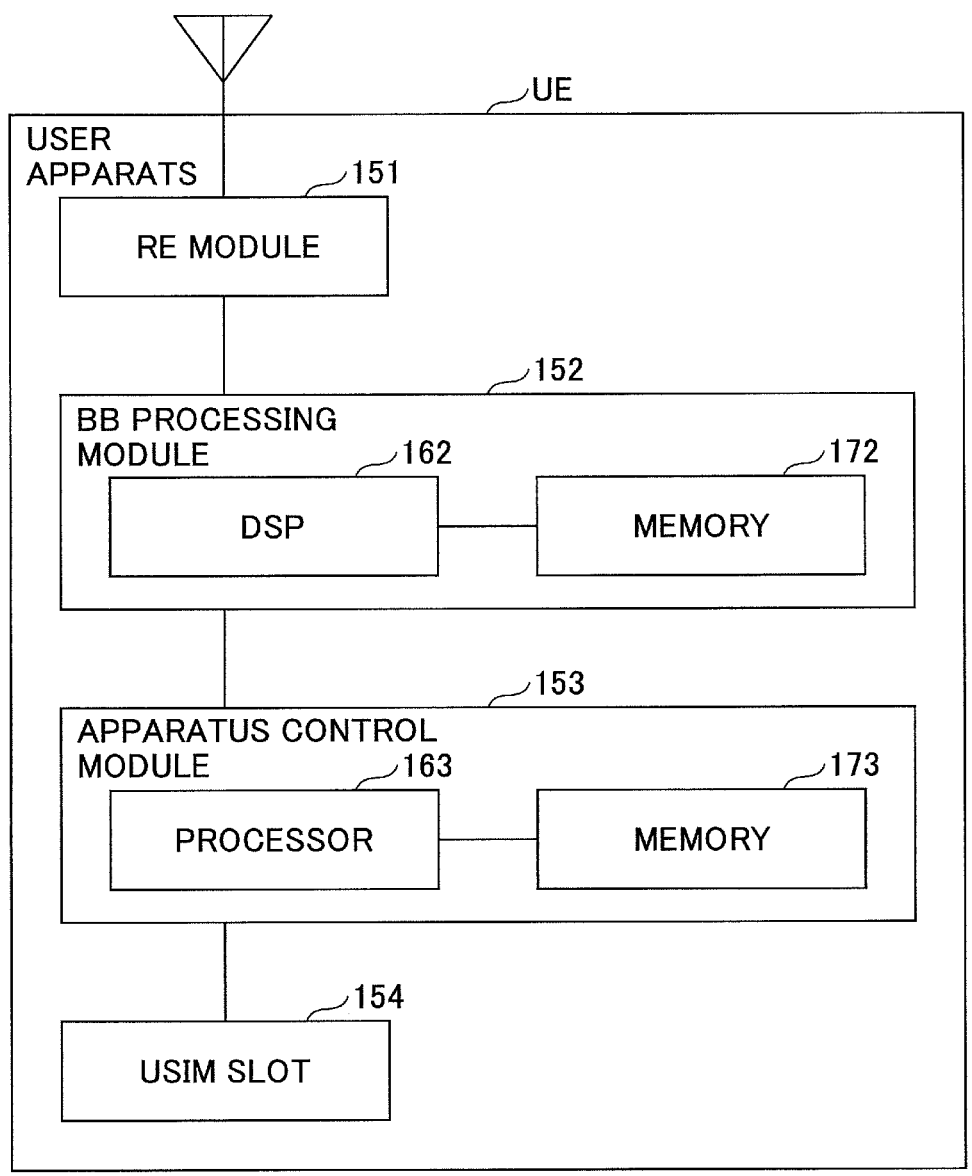
FIG. 25 is a HW block diagram of a user apparatus UE.

FIG. 25 is a diagram showing an example of a hardware (HW) configuration of the user apparatus UE. FIG. 25 shows a configuration closer to an implementation example than FIG. 24. As shown in FIG. 25, the UE includes an RE (Radio Equipment) module 151 for performing processing on radio signals, a BB (Base Band) processing module 152 for performing baseband signal processing, an apparatus control module 153 for performing processes of upper layer and the like, and a USIM slot 154 that is an interface for accessing a USIM card.

The RE module 151 generates a radio signal that should be transmitted from an antenna by performing D/A (Digital-to-Analog) conversion, modulation, frequency conversion, and power amplifying and the like on a digital baseband signal received from the BB processing module 152. Also, the RE module 151 generates a digital baseband signal by performing frequency conversion, A/D (Analog to Digital) conversion, demodulation and the like on a received radio signal, so as to pass the signal to the BB processing module 152. The RE module 151 includes, for example, functions of physical layer and the like of the DL signal reception unit 101 and the UL signal transmission unit 102.

The BB processing module 152 performs processing for converting between IP packets and digital baseband signals. The DSP (Digital Signal Processor) 162 is a processor for performing signal processing in the BB processing module 152. The memory 172 is used as a work area of the DSP 162. The BB processing module 152 may include, for example, functions of layer 2 and the like of the DL signal reception unit 101 and the UL signal transmission unit 102, and the RRC processing unit 103 and the transmission power control unit 104. Also, the BB processing module 152 may include a control unit configured to select a signaling value of the highest priority from among signaling values that the user apparatus UE can apply in a plurality of signaling values included in system information, and to perform cell selection or cell reselection using the maximum transmission power corresponding to the signaling value. All of or a part of functions of the RRC processing unit 103 and the transmission power control unit 104 and the control unit may be included in the apparatus control module 153.

The apparatus control module 153 performs protocol processing of IP layer, processing of various applications, and the like. The processor 163 is a processor for performing processes performed by the apparatus control module 153. The memory 173 is used as a work area of the processor 163. The processor 163 performs read and write of data with a USIM via the USIM slot 154.

<Base Station eNB>

Figure 26:
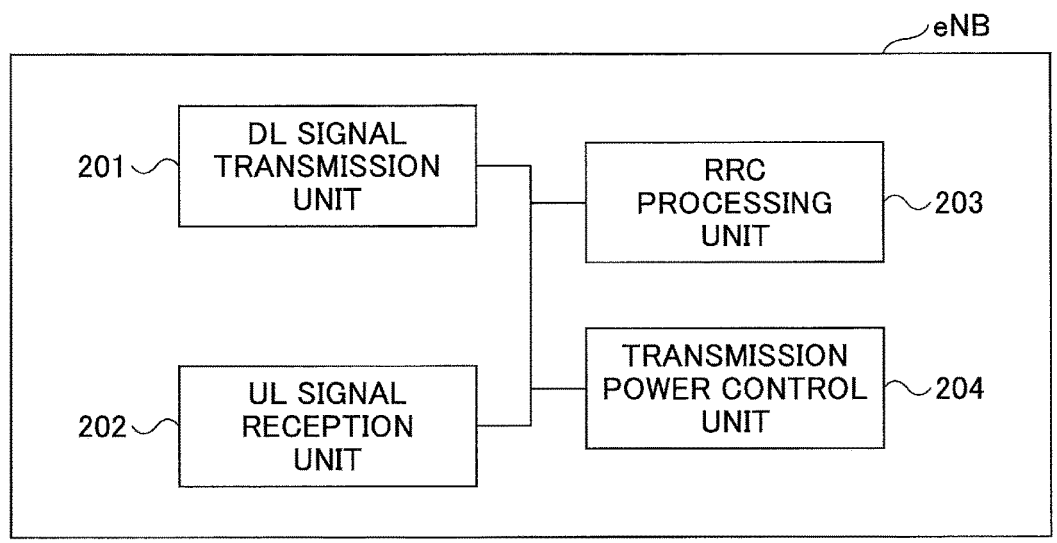
FIG. 26 is a block diagram of a base station eNB.

FIG. 26 shows a functional block diagram of a base station eNB. As shown in FIG. 26, the base station eNB includes a DL signal transmission unit 201, an UL signal reception unit 202, an RRC processing unit 203 and a transmission power control unit 204. FIG. 26 shows only functional units especially related to the embodiments of the present invention in the base station eNB, and the base station eNB includes functions not shown in the figure for at least performing operation complying with LTE.

The DL signal transmission unit 201 includes functions configured to generate various signals of physical layer from information of an upper layer that should be transmitted from the base station eNB so as to transmit the signals. The UL signal reception unit 202 includes functions configured to receive various uplink signals from the user apparatus UE, and obtain information of an upper layer from the received physical layer signals.

The RRC processing unit 203 performs generation and transmission of SIB1, SIB2, SIB3, SIB5 and the like described in the present embodiments and the modified examples. The transmission power control unit 204 performs, for example, scheduling, UL power control and the like for the user apparatus UE in consideration of the maximum transmission power of the user apparatus UE.

The configuration of the base station eNB shown in FIG. 26 may be realized by hardware circuits (example: one or a plurality of IC chips) as a whole, or may be realized by hardware circuits for a part and by a CPU and a program for other parts.

Figure 27:
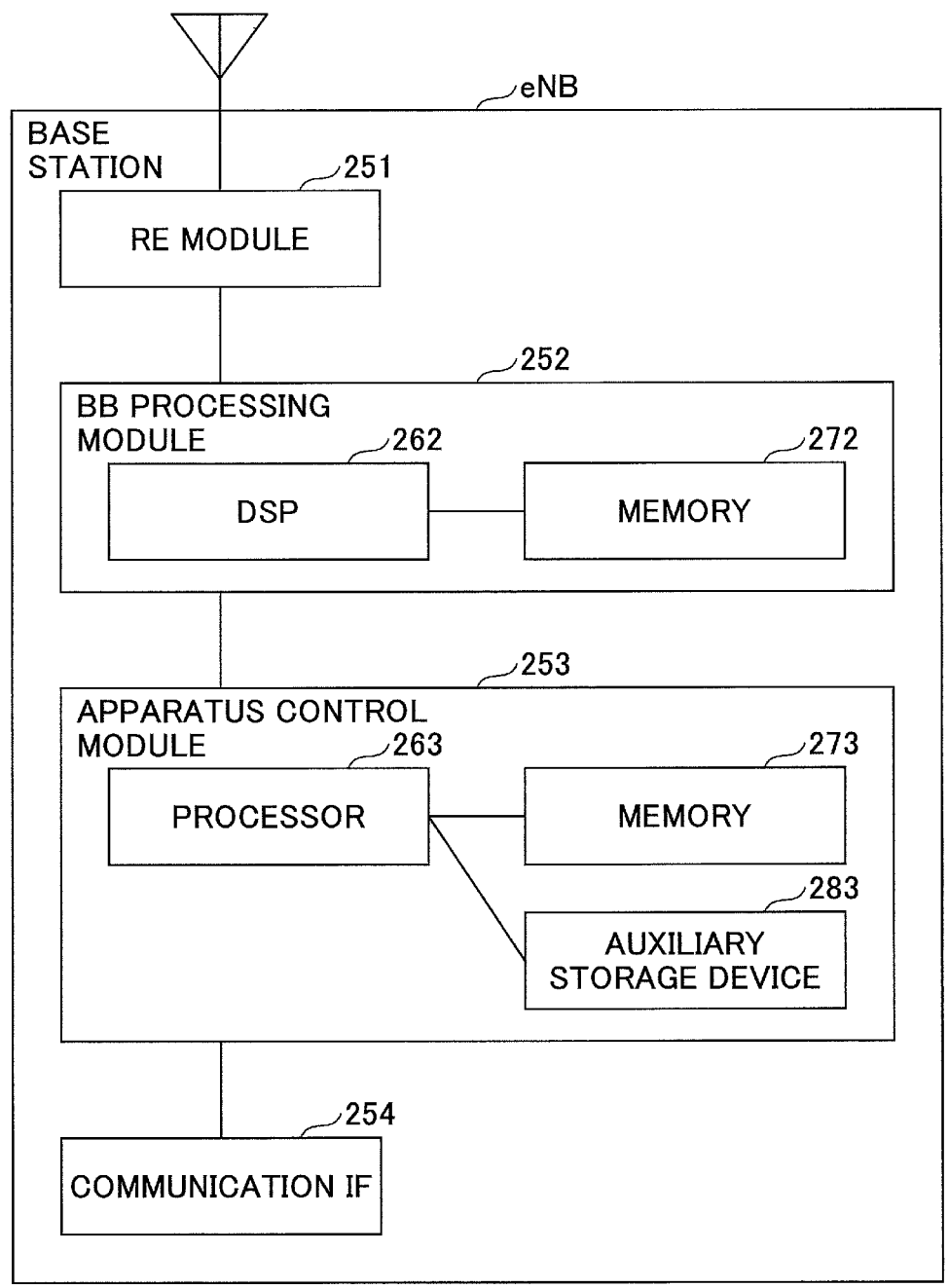
FIG. 27 is a HW block diagram of a base station eNB.

FIG. 27 is a diagram showing an example of a hardware (HW) configuration of the base station eNB. FIG. 27 shows a configuration closer to an implementation example than FIG. 26. As shown in FIG. 27, the base station eNB includes an RE module 251 for performing processing on radio signals, a BB processing module 252 for performing baseband signal processing, an apparatus control module 253 for perming processes of upper layer and the like, and a communication IF 254 that is an interface for connecting to a network.

The RE module 251 generates a radio signal that should be transmitted from an antenna by performing D/A conversion, modulation, frequency conversion, and power amplifying and the like on a digital baseband signal received form the BB processing module 252. Also, the RE module 251 generates a digital baseband signal by performing frequency conversion, A/D conversion, demodulation and the like on a received radio signal, so as to pass the signal to the BB processing module 252. The RE module 251 includes, for example, functions of physical layer and the like of the DL signal transmission unit 201 and the UL signal reception unit 202.

The BB processing module 252 performs processing for converting between IP packets and digital baseband signals. The DSP 262 is a processor for performing signal processing in the BB processing module 252. The memory 272 is used as a work area of the DSP 262. The BB processing module 252 may include, for example, functions of layer 2 and the like of the DL signal transmission unit 201 and the UL signal reception unit 202 of FIG. 26, and the RRC processing unit 203 and the transmission power control unit 204. All of or a part of functions of the RRC processing unit 203 and the transmission power control unit 204 may be included in the apparatus control module 253.

The apparatus control module 253 performs protocol processing of IP layer, OAM processing, and the like. The processor 263 is a processor for performing processes performed by the apparatus control module 253. The memory 273 is used as a work area of the processor 263. The auxiliary storage device 283 is, for example, an HDD and the like, and stores various setting information and the like for operation of the base station eNB.

The configuration (functional divisions) of the apparatuses shown in FIGS. 24-27 is merely an example. The implementation method (concrete arrangement of functional units and the like) is not limited to a specific implementation method as long as processes described in the present embodiments can be realized.

As described above, according to the present embodiment, there is provided a user apparatus in a mobile communication system including a base station and the user apparatus, including: reception means configured to receive a plurality of prioritized signaling values corresponding to a band that the user apparatus uses from the base station; selection means configured to select a signaling value of the highest priority from among signaling values that the user apparatus can apply in the plurality of signaling values; and control means configured to perform control of transmission power by applying the signaling value selected by the selection means.

According to the above-configuration, it becomes possible that a user apparatus properly select a signaling value so as to perform control of transmission power in a cell where a plurality of signaling values are transmitted. Also, it becomes possible to cause various user apparatuses of different applying ability of NS values to connect to a NW.

The plurality of signaling values include, for example, a value of a predetermined information element in a predetermined system information block and include one or a plurality of values in a predetermined list in the predetermined system information block, and the value of the predetermined information element is a signaling value of the lowest priority. According to this configuration, for example, a value of the existing information element can be used as a signaling value of the lowest priority, so that the existing signaling configuration can be effectively utilized.

The plurality of signaling values include, for example, a value of a predetermined information element in a predetermined system information block and include one or a plurality of values in a predetermined list in the predetermined system information block, and a storing order of values in the predetermined list may correspond to an order of priority of signaling values. According to this configuration, since priority can be determined based on the order in the list, it becomes unnecessary to use signaling for priority. Thus, efficient signaling can be performed.

Band information indicating a band that the user apparatus uses may be stored redundantly in a first list of a first system information bock, and the plurality of signaling values may be stored in positions, of a second list of a second system information block, corresponding to storing positions of the band information in the first list, and the selection means may obtain the plurality of signaling values from the positions of the second list. According to this configuration, a plurality of signaling values can be transmitted by utilizing a signaling method of the existing Multiple Frequency Band Indicator (MFBI).

A storing order of values in the second list may correspond to an order of priority of signaling values. According to this configuration, since priority can be determined based on the order in the list, it becomes unnecessary to use signaling for priority. Thus, efficient signaling can be performed.

The signaling value is, for example, a network signaling value (NS value) corresponding to a transmission condition including availability of application of A-MPR. According to this configuration, it becomes clear that the present invention can be applied to notification of a NS value of LTE.

Also, according to the present embodiment, there is provided a user apparatus in a mobile communication system including a base station and the user apparatus, including: reception means configured to receive a plurality of prioritized signaling values from the base station; selection means configured to select a signaling value of the highest priority from among signaling values that the user apparatus can apply in the plurality of signaling values; and control means configured to perform cell selection or cell reselection by using maximum transmission power corresponding to the signaling value selected by the selection means.

According to the above-configuration, it becomes possible that a user apparatus properly selects a signaling value so as to perform cell reselection in a cell where a plurality of signaling values are transmitted. As a result, it becomes possible that the user apparatus can perform transmission in a cell of a transition destination by using a proper maximum transmission power.

According to the present embodiment, there is provided a mobile communication system including a base station and a user apparatus, the base station including: transmission means configured to transmit a plurality of prioritized signaling values corresponding to a band that the user apparatus uses, the user apparatus including: reception means configured to receive the plurality of signaling values from the base station; selection means configured to select a signaling value of the highest priority from among signaling values that the user apparatus can apply in the plurality of signaling values; and control means configured to perform control of transmission power by applying the signaling value selected by the selection means.

According to the above-configuration, it becomes possible that a user apparatus properly select a signaling value so as to perform control of transmission power in a cell where a plurality of signaling values are transmitted. Also, it becomes possible to cause various user apparatuses of different applying ability of NS values to connect to a NW.

The user apparatus UE described in the present embodiment may include a CPU and a memory and may be realized by executing a program by the CPU (processor), or may be realized by hardware such as hardware circuits including logics of processing described in the present embodiment, or may be configured by coexistence of a program and hardware.

The base station eNB described in the present embodiment may include a CPU and a memory and may be realized by executing a program by the CPU (processor), or may be realized by hardware such as hardware circuits including logics of processing described in the present embodiment, or may be configured by coexistence of a program and hardware.

In the above, the embodiment of the present invention has been explained. However, the disclosed invention is not limited to the embodiments. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE and the base station eNB have been explained by using functional block diagrams. However, such an apparatus may be implemented in hardware, software, or a combination thereof.

Each of the software executed by a processor provided in the user apparatus UE according to an embodiment of the present invention and the software executed by a processor provided in the base station eNB may be stored in any proper storage medium such as a Random Access Memory (RAM), a flash memory, a Read Only Memory (ROM), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present patent application claims priority based on Japanese patent application No. 2014-227472, filed in the JPO on Nov. 7, 2014 and Japanese patent application No. 2015-109146, filed in the JPO on May 28, 2015, and the entire contents of the Japanese patent application No. 2014-227472 and the Japanese patent application No. 2015-109146 are incorporated herein by reference.

DESCRIPTION OF REFERENCE SIGNS eNB base station
UE user apparatus
101 DL signal reception unit
102 UL signal transmission unit
103 RRC processing unit
104 transmission power control unit
151 RE module
152 BB processing module
153 apparatus control module
154 USIM slot
201 DL signal transmission unit
202 UL signal reception unit
203 RRC processing unit
204 transmission power control unit
251 RE module
252 BB processing module
253 apparatus control module
254 communication IF

The invention claimed is:

1. A user apparatus in a mobile communication system including a base station and the user apparatus, comprising:
   a reception unit configured to receive a plurality of prioritized signaling values corresponding to a band that the user apparatus uses from the base station;
   a selection unit configured to select a signaling value of the highest priority from among signaling values that the user apparatus can apply in the plurality of signaling values; and
   a control unit configured to perform control of transmission power by applying the signaling value selected by the selection unit.

2. The user apparatus as claimed in claim 1, wherein the plurality of signaling values include a value of a predetermined information element in a predetermined system information block and include one or a plurality of values in a predetermined list in the predetermined system information block, and the value of the predetermined information element is a signaling value of the lowest priority.

3. The user apparatus as claimed in claim 2, wherein the plurality of signaling values include a value of a predetermined information element in a predetermined system information block and include one or a plurality of values in a predetermined list in the predetermined system information block, and a storing order of values in the predetermined list corresponds to an order of priority of signaling values.

4. The user apparatus as claimed in claim 2, wherein the signaling value is a network signaling value corresponding to a transmission condition including availability of application of A-MPR.

5. The user apparatus as claimed in claim 1, wherein the plurality of signaling values include a value of a predetermined information element in a predetermined system information block and include one or a plurality of values in a predetermined list in the predetermined system information block, and a storing order of values in the predetermined list corresponds to an order of priority of signaling values.

6. The user apparatus as claimed in claim 5, wherein the signaling value is a network signaling value corresponding to a transmission condition including availability of application of A-MPR.

7. The user apparatus as claimed in claim 1, wherein band information indicating a band that the user apparatus uses is stored redundantly in a first list of a first system information bock, and
wherein the plurality of signaling values are stored in positions, of a second list of a second system information block, corresponding to storing positions of the band information in the first list, and the selection unit obtains the plurality of signaling values from the positions of the second list.

8. The user apparatus as claimed in claim 7, wherein a storing order of values in the second list corresponds to an order of priority of signaling values.

9. The user apparatus as claimed in claim 8, wherein the signaling value is a network signaling value corresponding to a transmission condition including availability of application of A-MPR.

10. The user apparatus as claimed in claim 7, wherein the signaling value is a network signaling value corresponding to a transmission condition including availability of application of A-MPR.

11. The user apparatus as claimed in claim 1, wherein the signaling value is a network signaling value corresponding to a transmission condition including availability of application of Additional-Maximum Power Reduction (A-MPR).

12. A user apparatus in a mobile communication system including a base station and the user apparatus, comprising:
a reception unit configured to receive a plurality of prioritized signaling values from the base station;
a selection unit configured to select a signaling value of the highest priority from among signaling values that the user apparatus can apply in the plurality of signaling values; and
a control unit configured to perform cell selection or cell reselection by using maximum transmission power corresponding to the signaling value selected by the selection unit.

13. A mobile communication system including a base station and a user apparatus,
the base station comprising:
a transmission unit configured to transmit a plurality of prioritized signaling values corresponding to a band that the user apparatus uses,
the user apparatus comprising:
a reception unit configured to receive the plurality of signaling values from the base station;
a selection unit configured to select a signaling value of the highest priority from among signaling values that the user apparatus can apply in the plurality of signaling values; and
a control unit configured to perform control of transmission power by applying the signaling value selected by the selection unit.

14. A signaling value application method executed by a user apparatus in a mobile communication system including a base station and the user apparatus, comprising:
a reception step of receiving a plurality of prioritized signaling values corresponding to a band that the user apparatus uses from the base station;
a selection step of selecting a signaling value of the highest priority from among signaling values that the user apparatus can apply in the plurality of signaling values; and
a control step of performing control of transmission power by applying the signaling value selected by the selection step.

15. A signaling value application method executed by a mobile communication system including a base station and a user apparatus, comprising:
a transmission step in which the base station transmits a plurality of prioritized signaling values corresponding to a band that the user apparatus uses;
a reception step in which the user apparatus receives the plurality of signaling values from the base station;
a selection step in which the user apparatus selects a signaling value of the highest priority from among signaling values that the user apparatus can apply in the plurality of signaling values; and
a control step in which the user apparatus performs control of transmission power by applying the signaling value selected by the selection step.

* * * * *